US009345951B2

(12) United States Patent
Czyzewski et al.

(10) Patent No.: US 9,345,951 B2
(45) Date of Patent: *May 24, 2016

(54) METHODS AND APPARATUSES FOR AN AUTOMATIC CARD HANDLING DEVICE AND COMMUNICATION NETWORKS INCLUDING SAME

(71) Applicant: Bally Gaming, Inc., Las Vegas, NV (US)

(72) Inventors: Zbigniew Czyzewski, Henderson, NV (US); Vladislav Zvercov, Las Vegas, NV (US); Attila Grauzer, Las Vegas, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/137,557

(22) Filed: Dec. 20, 2013

(65) Prior Publication Data

US 2014/0183818 A1  Jul. 3, 2014

Related U.S. Application Data

(63) Continuation of application No. 11/558,818, filed on Nov. 10, 2006, now Pat. No. 8,616,552, which is a continuation-in-part of application No. 09/967,500, filed on Sep. 28, 2001, now Pat. No. 8,337,296.

(51) Int. Cl.
*G06F 17/00* (2006.01)
*G06F 19/00* (2011.01)
(Continued)

(52) U.S. Cl.
CPC . *A63F 1/12* (2013.01); *G07F 17/32* (2013.01); *G07F 17/3232* (2013.01); *G07F 17/3234* (2013.01); *A63F 1/14* (2013.01); *A63F 2009/2411* (2013.01)

(58) Field of Classification Search
CPC .............. A63F 1/10; A63F 1/12; A63F 1/14; A63F 1/18; A63F 3/0057; A63F 2009/2411; A63F 3/00157; G07F 17/32; G07F 17/3202; G07F 17/3216; G07F 17/322; G07F 17/3223; G07F 17/3225; G07F 17/3232; G07F 17/3234; G07F 17/3204; G07F 17/3293; G07F 17/3241
USPC .......... 273/149 R; 463/11–13, 16, 25, 29–31, 463/40–43
See application file for complete search history.

(56) References Cited

U.S. PATENT DOCUMENTS 130,281 A   8/1872  Coughlin
205,030 A   6/1878  Ash
(Continued)

FOREIGN PATENT DOCUMENTS

AU   5025479 A    3/1980
AU    697805 B2   10/1998
(Continued)

OTHER PUBLICATIONS

International Search Report for International Application No. PCT/US07/23168, dated Sep. 12, 2008, 3 pages.
(Continued)

*Primary Examiner* — Milap Shah
(74) *Attorney, Agent, or Firm* — TraskBritt

(57) ABSTRACT

An automatic card handling device, automatic card handling devices within a network, and methods of use are disclosed. An automatic card handling device includes a shuffling apparatus with a controller and configured to deliver a set of shuffled cards, and a communication module operably coupled to the controller. The communication module is configured for establishing an electronic communication with a local or world-wide network and thereafter sending and receiving information related to the operation of the automatic card handling device across the network. A network of automatic card handling devices may include a plurality of automatic card shufflers. The network may also include at least one server operably coupled to the plurality of automatic card shufflers. In addition, the server may be operably coupled to a service center through a world-wide network.

20 Claims, 6 Drawing Sheets

(51) Int. Cl.
*A63F 9/24* (2006.01)
*A63F 13/00* (2014.01)
*A63F 1/12* (2006.01)
*G07F 17/32* (2006.01)
*A63F 1/14* (2006.01)

(56) References Cited

U.S. PATENT DOCUMENTS

| | | |
|---|---|---|
| 609,730 A | 8/1898 | Booth |
| 673,154 A | 4/1901 | Bellows |
| 793,489 A | 6/1905 | Williams |
| 892,389 A | 7/1908 | Bellows |
| 1,014,219 A | 1/1912 | Hall |
| 1,043,109 A | 11/1912 | Hurm |
| 1,157,898 A | 10/1915 | Perret |
| 1,556,856 A | 10/1925 | Lipps |
| 1,850,114 A | 3/1932 | McCaddin |
| 1,885,276 A | 11/1932 | McKay |
| 1,955,926 A | 4/1934 | Matthaey |
| 1,992,085 A | 2/1935 | McKay |
| 1,998,690 A | 4/1935 | Hartridge et al. |
| 2,001,220 A | 5/1935 | Smith |
| 2,001,918 A | 5/1935 | Nevius |
| 2,016,030 A | 10/1935 | Woodruff et al. |
| 2,043,343 A | 6/1936 | Warner |
| 2,060,096 A | 11/1936 | McCoy |
| 2,065,824 A | 12/1936 | Plass |
| 2,159,958 A | 5/1939 | Sachs |
| 2,185,474 A | 1/1940 | Nott |
| 2,254,484 A | 9/1941 | Hutchins |
| D132,360 S | 5/1942 | Gardner |
| 2,328,153 A | 8/1943 | Laing |
| 2,328,879 A | 9/1943 | Isaacson |
| 2,364,413 A | 12/1944 | Wittel |
| 2,525,305 A | 10/1950 | Lombard |
| 2,543,522 A | 2/1951 | Cohen |
| 2,588,582 A | 3/1952 | Sivertson |
| 2,661,215 A | 12/1953 | Stevens |
| 2,676,020 A | 4/1954 | Ogden |
| 2,692,777 A | 10/1954 | Miller |
| 2,701,720 A | 2/1955 | Ogden |
| 2,705,638 A | 4/1955 | Newcomb |
| 2,711,319 A | 6/1955 | Morgan |
| 2,714,510 A | 8/1955 | Oppenlander et al. |
| 2,717,782 A | 9/1955 | Droll |
| 2,727,747 A | 12/1955 | Semisch, Jr. |
| 2,731,271 A | 1/1956 | Brown |
| 2,747,877 A | 5/1956 | Howard |
| 2,755,090 A | 7/1956 | Aldrich |
| 2,757,005 A | 7/1956 | Nothaft |
| 2,760,779 A | 8/1956 | Ogden et al. |
| 2,770,459 A | 11/1956 | Wilson et al. |
| 2,778,643 A | 1/1957 | Williams |
| 2,778,644 A | 1/1957 | Stephenson |
| 2,782,040 A | 2/1957 | Matter |
| 2,790,641 A | 4/1957 | Adams |
| 2,793,863 A | 5/1957 | Liebelt |
| 2,815,214 A | 12/1957 | Hall |
| 2,821,399 A | 1/1958 | Heinoo |
| 2,914,215 A | 11/1959 | Neidig |
| 2,937,739 A | 5/1960 | Moise |
| 2,950,005 A | 8/1960 | MacDonald |
| RE24,986 E | 1/1961 | Stephenson |
| 3,067,885 A | 12/1962 | Kohler |
| 3,107,096 A | 10/1963 | Osborn |
| 3,124,674 A | 3/1964 | Edwards et al. |
| 3,131,935 A | 5/1964 | Gronneberg |
| 3,147,978 A | 9/1964 | Sjostrand |
| 3,222,071 A | 12/1965 | Lang |
| 3,235,741 A | 2/1966 | Plaisance |
| 3,288,308 A | 11/1966 | Gingher |
| 3,305,237 A | 2/1967 | Granius |
| 3,312,473 A | 4/1967 | Friedman et al. |
| 3,452,509 A | 7/1969 | Hauer |
| 3,530,968 A | 9/1970 | Palmer |
| 3,588,116 A | 6/1971 | Miura |
| 3,589,730 A | 6/1971 | Slay |
| 3,595,388 A | 7/1971 | Castaldi |
| 3,597,076 A | 8/1971 | Hubbard |
| 3,618,933 A | 11/1971 | Roggenstein et al. |
| 3,627,331 A | 12/1971 | Lyon, Jr. |
| 3,666,270 A | 5/1972 | Mazur |
| 3,680,853 A | 8/1972 | Houghton et al. |
| 3,690,670 A | 9/1972 | Cassady et al. |
| 3,704,938 A | 12/1972 | Fanselow |
| 3,716,238 A | 2/1973 | Porter |
| 3,751,041 A | 8/1973 | Seifert |
| 3,761,079 A | 9/1973 | Azure, Jr. |
| 3,810,627 A | 5/1974 | Levy |
| 3,861,261 A | 1/1975 | Maxey |
| 3,897,954 A | 8/1975 | Erickson et al. |
| 3,909,002 A | 9/1975 | Levy et al. |
| 3,929,339 A | 12/1975 | Mattioli et al. |
| 3,944,077 A | 3/1976 | Green |
| 3,944,230 A | 3/1976 | Fineman |
| 3,949,219 A | 4/1976 | Crouse |
| 3,968,364 A | 7/1976 | Miller |
| 4,023,705 A | 5/1977 | Reiner et al. |
| 4,033,590 A | 7/1977 | Pic |
| 4,072,930 A | 2/1978 | Lucero et al. |
| 4,088,265 A | 5/1978 | Garczynski |
| 4,151,410 A | 4/1979 | McMillan et al. |
| 4,159,581 A | 7/1979 | Lichtenberg |
| 4,162,649 A | 7/1979 | Thornton |
| 4,166,615 A | 9/1979 | Noguchi et al. |
| 4,232,861 A | 11/1980 | Maul |
| 4,280,690 A | 7/1981 | Hill |
| 4,283,709 A | 8/1981 | Lucero et al. |
| 4,310,160 A | 1/1982 | Willette |
| 4,339,134 A | 7/1982 | Macheel |
| 4,339,798 A | 7/1982 | Hedges et al. |
| 4,361,393 A | 11/1982 | Noto |
| 4,368,972 A | 1/1983 | Naramore |
| 4,369,972 A | 1/1983 | Parker |
| 4,374,309 A | 2/1983 | Walton |
| 4,377,285 A | 3/1983 | Kadlic |
| 4,385,827 A | 5/1983 | Naramore |
| 4,388,994 A | 6/1983 | Suda et al. |
| 4,397,469 A | 8/1983 | Carter |
| 4,421,312 A | 12/1983 | Delgado et al. |
| 4,421,501 A | 12/1983 | Scheffer |
| D274,069 S | 5/1984 | Fromm |
| 4,467,424 A | 8/1984 | Hedges et al. |
| 4,494,197 A | 1/1985 | Troy et al. |
| 4,497,488 A | 2/1985 | Plevyak et al. |
| 4,512,580 A | 4/1985 | Matviak |
| 4,513,969 A | 4/1985 | Samsel |
| 4,515,367 A | 5/1985 | Howard |
| 4,531,187 A | 7/1985 | Uhland et al. |
| 4,534,562 A | 8/1985 | Cuff et al. |
| 4,549,738 A | 10/1985 | Greitzer |
| 4,566,782 A | 1/1986 | Britt et al. |
| 4,575,367 A | 3/1986 | Karmel |
| 4,586,712 A | 5/1986 | Lorber et al. |
| 4,659,082 A | 4/1987 | Greenberg |
| 4,662,637 A | 5/1987 | Pfeiffer |
| 4,662,816 A | 5/1987 | Fabrig |
| 4,667,959 A | 5/1987 | Pfeiffer et al. |
| 4,741,524 A | 5/1988 | Bromage |
| 4,750,743 A | 6/1988 | Nicoletti |
| 4,755,941 A | 7/1988 | Bacchi |
| 4,759,448 A | 7/1988 | Kawabata |
| 4,770,412 A | 9/1988 | Wolfe |
| 4,770,421 A | 9/1988 | Hoffman |
| 4,807,884 A | 2/1989 | Breeding |
| 4,822,050 A | 4/1989 | Normand et al. |
| 4,832,342 A | 5/1989 | Plevyak |
| 4,858,000 A | 8/1989 | Lu |
| 4,861,041 A | 8/1989 | Jones et al. |
| 4,876,000 A | 10/1989 | Mikhail |
| 4,900,009 A | 2/1990 | Kitahara et al. |
| 4,904,830 A | 2/1990 | Rizzuto |
| 4,921,109 A | 5/1990 | Hasuo et al. |
| 4,926,327 A | 5/1990 | Sidley |

(56) References Cited

U.S. PATENT DOCUMENTS

| | | |
|---|---|---|
| 4,948,134 A | 8/1990 | Suttle et al. |
| 4,951,950 A | 8/1990 | Normand et al. |
| 4,969,648 A | 11/1990 | Hollinger et al. |
| 4,993,587 A | 2/1991 | Abe |
| 4,995,615 A | 2/1991 | Cheng |
| 5,000,453 A | 3/1991 | Stevens et al. |
| 5,039,102 A | 8/1991 | Miller et al. |
| 5,067,713 A | 11/1991 | Soules et al. |
| 5,078,405 A | 1/1992 | Jones et al. |
| 5,081,487 A | 1/1992 | Hoyer et al. |
| 5,096,197 A | 3/1992 | Embury |
| 5,102,293 A | 4/1992 | Schneider |
| 5,118,114 A | 6/1992 | Tucci |
| 5,121,192 A | 6/1992 | Kazui |
| 5,121,921 A | 6/1992 | Friedman |
| 5,154,429 A | 10/1992 | LeVasseur |
| 5,179,517 A | 1/1993 | Sarbin et al. |
| 5,197,094 A | 3/1993 | Tillery et al. |
| 5,199,710 A | 4/1993 | Lamle |
| 5,209,476 A | 5/1993 | Eiba et al. |
| 5,224,712 A | 7/1993 | Laughlin et al. |
| 5,240,140 A | 8/1993 | Huen |
| 5,248,142 A | 9/1993 | Breeding et al. |
| 5,257,179 A | 10/1993 | DeMar |
| 5,259,907 A | 11/1993 | Soules et al. |
| 5,261,667 A | 11/1993 | Breeding |
| 5,267,248 A | 11/1993 | Reyner |
| 5,275,411 A | 1/1994 | Breeding |
| 5,276,312 A | 1/1994 | McCarthy |
| 5,283,422 A | 2/1994 | Storch et al. |
| 5,288,081 A | 2/1994 | Breeding et al. |
| 5,299,089 A | 3/1994 | Lwee |
| 5,303,921 A | 4/1994 | Breeding |
| 5,344,146 A | 9/1994 | Lee |
| 5,356,145 A | 10/1994 | Verschoor |
| 5,362,053 A | 11/1994 | Miller et al. |
| 5,374,061 A | 12/1994 | Albrecht et al. |
| 5,377,973 A | 1/1995 | Jones et al. |
| 5,382,024 A | 1/1995 | Blaha |
| 5,382,025 A | 1/1995 | Sklansky et al. |
| 5,390,910 A | 2/1995 | Mandel et al. |
| 5,397,128 A | 3/1995 | Hesse et al. |
| 5,397,133 A | 3/1995 | Penzias et al. |
| 5,416,308 A | 5/1995 | Hood et al. |
| 5,431,399 A | 7/1995 | Kelley |
| 5,431,407 A | 7/1995 | Hofberg et al. |
| 5,437,462 A | 8/1995 | Breeding et al. |
| 5,445,377 A | 8/1995 | Steinbach |
| 5,470,079 A | 11/1995 | LeStrange et al. |
| D365,853 S | 1/1996 | Zadro |
| 5,489,101 A | 2/1996 | Moody |
| 5,515,477 A | 5/1996 | Sutherland |
| 5,524,888 A | 6/1996 | Heidel |
| 5,531,448 A | 7/1996 | Moody et al. |
| 5,544,892 A | 8/1996 | Breeding et al. |
| 5,575,475 A | 11/1996 | Steinbach |
| 5,584,483 A | 12/1996 | Sines et al. |
| 5,586,766 A | 12/1996 | Forte et al. |
| 5,586,936 A | 12/1996 | Bennett et al. |
| 5,605,334 A | 2/1997 | McCrea et al. |
| 5,613,912 A | 3/1997 | Slater et al. |
| 5,632,483 A | 5/1997 | Garczynski et al. |
| 5,636,843 A | 6/1997 | Roberts et al. |
| 5,651,548 A | 7/1997 | French et al. |
| 5,655,961 A | 8/1997 | Acres et al. |
| 5,669,816 A | 9/1997 | Garczynski et al. |
| 5,676,231 A | 10/1997 | Legras et al. |
| 5,676,372 A | 10/1997 | Sines et al. |
| 5,681,039 A | 10/1997 | Miller et al. |
| 5,683,085 A | 11/1997 | Johnson et al. |
| 5,685,543 A | 11/1997 | Garner et al. |
| 5,690,324 A | 11/1997 | Otomo et al. |
| 5,692,748 A | 12/1997 | Frisco et al. |
| 5,695,189 A | 12/1997 | Breeding et al. |
| 5,701,565 A | 12/1997 | Morgan |
| 5,707,286 A | 1/1998 | Carlson |
| 5,707,287 A | 1/1998 | McCrea et al. |
| 5,711,525 A | 1/1998 | Breeding et al. |
| 5,718,427 A | 2/1998 | Cranford et al. |
| 5,719,288 A | 2/1998 | Sens et al. |
| 5,720,484 A | 2/1998 | Hsu et al. |
| 5,722,893 A | 3/1998 | Hill et al. |
| 5,735,525 A | 4/1998 | McCrea et al. |
| 5,735,724 A | 4/1998 | Udagawa |
| 5,735,742 A | 4/1998 | French et al. |
| 5,743,798 A | 4/1998 | Adams et al. |
| 5,768,382 A | 6/1998 | Schneier et al. |
| 5,770,533 A | 6/1998 | Franchi et al. |
| 5,770,553 A | 6/1998 | Kroner et al. |
| 5,772,505 A | 6/1998 | Garczynski et al. |
| 5,779,546 A | 7/1998 | Meissner et al. |
| 5,781,647 A | 7/1998 | Fishbine et al. |
| 5,785,321 A | 7/1998 | van Putten et al. |
| 5,788,574 A | 8/1998 | Ornstein et al. |
| 5,791,988 A | 8/1998 | Nomi et al. |
| 5,802,560 A | 9/1998 | Joseph et al. |
| 5,803,808 A | 9/1998 | Strisower |
| 5,810,355 A | 9/1998 | Trilli |
| 5,813,326 A | 9/1998 | Salomon |
| 5,813,912 A | 9/1998 | Shultz |
| 5,814,796 A | 9/1998 | Benson et al. |
| 5,836,775 A | 11/1998 | Hiyama et al. |
| 5,839,730 A | 11/1998 | Pike |
| 5,845,906 A | 12/1998 | Wirth |
| 5,851,011 A | 12/1998 | Lott et al. |
| 5,867,586 A | 2/1999 | Liang |
| 5,879,233 A | 3/1999 | Stupero |
| 5,883,804 A | 3/1999 | Christensen |
| 5,890,717 A | 4/1999 | Rosewarne et al. |
| 5,892,210 A | 4/1999 | Levasseur |
| 5,911,626 A | 6/1999 | McCrea et al. |
| 5,919,090 A | 7/1999 | Mothwurf |
| 5,936,222 A | 8/1999 | Korsunsky et al. |
| 5,941,769 A | 8/1999 | Order |
| 5,944,310 A | 8/1999 | Johnson et al. |
| D414,527 S | 9/1999 | Tedham |
| 5,957,776 A | 9/1999 | Hoehne |
| 5,974,150 A | 10/1999 | Kaish et al. |
| 5,985,305 A | 11/1999 | Peery et al. |
| 5,989,122 A | 11/1999 | Roblejo et al. |
| 5,991,308 A | 11/1999 | Fuhrmann et al. |
| 6,015,311 A | 1/2000 | Benjamin et al. |
| 6,019,368 A | 2/2000 | Sines et al. |
| 6,019,374 A | 2/2000 | Breeding |
| 6,039,650 A | 3/2000 | Hill et al. |
| 6,050,569 A | 4/2000 | Taylor |
| 6,053,695 A | 4/2000 | Longoria et al. |
| 6,061,449 A | 5/2000 | Candelore et al. |
| 6,068,258 A | 5/2000 | Breeding et al. |
| 6,069,564 A | 5/2000 | Hatano et al. |
| 6,071,190 A | 6/2000 | Weiss et al. |
| 6,093,103 A | 7/2000 | McCrea et al. |
| 6,113,101 A | 9/2000 | Wirth |
| 6,117,012 A | 9/2000 | McCrea et al. |
| D432,588 S | 10/2000 | Tedham |
| 6,126,166 A | 10/2000 | Lorson et al. |
| 6,127,447 A | 10/2000 | Mitry et al. |
| 6,131,817 A | 10/2000 | Miller |
| 6,139,014 A | 10/2000 | Breeding et al. |
| 6,149,154 A | 11/2000 | Grauzer et al. |
| 6,154,131 A | 11/2000 | Jones et al. |
| 6,165,069 A | 12/2000 | Sines et al. |
| 6,165,072 A | 12/2000 | Davis et al. |
| 6,183,362 B1 | 2/2001 | Boushy |
| 6,186,895 B1 | 2/2001 | Oliver |
| 6,196,416 B1 | 3/2001 | Seagle |
| 6,200,218 B1 | 3/2001 | Lindsay |
| 6,210,274 B1 | 4/2001 | Carlson |
| 6,213,310 B1 | 4/2001 | Wennersten et al. |
| 6,217,447 B1 | 4/2001 | Lofink et al. |
| 6,234,900 B1 | 5/2001 | Cumbers |
| 6,236,223 B1 | 5/2001 | Brady et al. |
| 6,250,632 B1 | 6/2001 | Albrecht |
| 6,254,002 B1 | 7/2001 | Litman |

(56) References Cited

U.S. PATENT DOCUMENTS

| | | |
|---|---|---|
| 6,254,096 B1 | 7/2001 | Grauzer et al. |
| 6,254,484 B1 | 7/2001 | McCrea, Jr. |
| 6,257,981 B1 | 7/2001 | Acres et al. |
| 6,267,248 B1 | 7/2001 | Johnson et al. |
| 6,267,648 B1 | 7/2001 | Katayama et al. |
| 6,267,671 B1 | 7/2001 | Hogan |
| 6,270,404 B2 | 8/2001 | Sines et al. |
| 6,272,223 B1 | 8/2001 | Carlson |
| 6,293,546 B1 | 9/2001 | Hessing et al. |
| 6,293,864 B1 | 9/2001 | Romero |
| 6,299,167 B1 | 10/2001 | Sines et al. |
| 6,299,534 B1 | 10/2001 | Breeding et al. |
| 6,299,536 B1 | 10/2001 | Hill |
| 6,308,886 B1 | 10/2001 | Benson et al. |
| 6,313,871 B1 | 11/2001 | Schubert |
| 6,325,373 B1 | 12/2001 | Breeding et al. |
| 6,334,614 B1 | 1/2002 | Breeding |
| 6,341,778 B1 | 1/2002 | Lee |
| 6,342,830 B1 | 1/2002 | Want et al. |
| 6,346,044 B1 | 2/2002 | McCrea, Jr. |
| 6,361,044 B1 | 3/2002 | Block et al. |
| 6,386,973 B1 | 5/2002 | Yoseloff |
| 6,402,142 B1 | 6/2002 | Warren et al. |
| 6,403,908 B2 | 6/2002 | Stardust et al. |
| 6,443,839 B2 | 9/2002 | Stockdale |
| 6,446,864 B1 | 9/2002 | Kim et al. |
| 6,454,266 B1 | 9/2002 | Breeding et al. |
| 6,460,848 B1 | 10/2002 | Soltys et al. |
| 6,464,584 B2 | 10/2002 | Oliver |
| 6,490,277 B1 | 12/2002 | Tzotzkov |
| 6,508,709 B1 | 1/2003 | Karmarkar |
| 6,514,140 B1 | 2/2003 | Storch |
| 6,517,435 B2 | 2/2003 | Soltys et al. |
| 6,517,436 B2 | 2/2003 | Soltys et al. |
| 6,520,857 B2 | 2/2003 | Soltys et al. |
| 6,527,271 B2 | 3/2003 | Soltys et al. |
| 6,530,836 B2 | 3/2003 | Soltys et al. |
| 6,530,837 B2 | 3/2003 | Soltys et al. |
| 6,532,297 B1 | 3/2003 | Lindquist |
| 6,533,276 B2 | 3/2003 | Soltys et al. |
| 6,533,662 B2 | 3/2003 | Soltys et al. |
| 6,561,897 B1 | 5/2003 | Bourbour et al. |
| 6,568,678 B2 | 5/2003 | Breeding et al. |
| 6,579,180 B2 | 6/2003 | Soltys et al. |
| 6,579,181 B2 | 6/2003 | Soltys et al. |
| 6,581,747 B1 | 6/2003 | Charlier et al. |
| 6,582,301 B2 | 6/2003 | Hill |
| 6,582,302 B2 | 6/2003 | Romero |
| 6,585,586 B1 | 7/2003 | Romero |
| 6,585,588 B1 | 7/2003 | Hartl |
| 6,585,856 B2 | 7/2003 | Zwick et al. |
| 6,588,750 B1 | 7/2003 | Scheper et al. |
| 6,588,751 B1 | 7/2003 | Grauzer et al. |
| 6,595,857 B2 | 7/2003 | Soltys et al. |
| 6,609,710 B1 | 8/2003 | Order |
| 6,612,928 B1 | 9/2003 | Bradford et al. |
| 6,616,535 B1 | 9/2003 | Nishizaki et al. |
| 6,619,662 B2 | 9/2003 | Miller |
| 6,622,185 B1 | 9/2003 | Johnson |
| 6,626,757 B2 | 9/2003 | Oliveras |
| 6,629,019 B2 | 9/2003 | Legge et al. |
| 6,629,591 B1 | 10/2003 | Griswold et al. |
| 6,629,889 B2 | 10/2003 | Mothwurf |
| 6,629,894 B2 | 10/2003 | Purton |
| 6,637,622 B1 | 10/2003 | Robinson |
| 6,638,161 B2 | 10/2003 | Soltys et al. |
| 6,645,068 B1 | 11/2003 | Kelly et al. |
| 6,645,077 B2 | 11/2003 | Rowe |
| 6,651,981 B2 | 11/2003 | Grauzer et al. |
| 6,651,982 B2 | 11/2003 | Grauzer et al. |
| 6,651,985 B2 | 11/2003 | Sines et al. |
| 6,652,379 B2 | 11/2003 | Soltys et al. |
| 6,655,684 B2 | 12/2003 | Grauzer et al. |
| 6,655,690 B1 | 12/2003 | Oskwarek |
| 6,658,135 B1 | 12/2003 | Morito et al. |
| 6,659,460 B2 | 12/2003 | Blaha et al. |
| 6,659,461 B2 | 12/2003 | Yoseloff et al. |
| 6,659,875 B2 | 12/2003 | Purton |
| 6,663,490 B2 | 12/2003 | Soltys et al. |
| 6,666,768 B1 | 12/2003 | Akers |
| 6,671,358 B1 | 12/2003 | Seidman et al. |
| 6,676,127 B2 | 1/2004 | Johnson et al. |
| 6,676,517 B2 | 1/2004 | Beavers |
| 6,680,843 B2 | 1/2004 | Farrow et al. |
| 6,685,564 B2 | 2/2004 | Oliver |
| 6,685,567 B2 | 2/2004 | Cockerille et al. |
| 6,685,568 B2 | 2/2004 | Soltys et al. |
| 6,688,597 B2 | 2/2004 | Jones |
| 6,688,979 B2 | 2/2004 | Soltys et al. |
| 6,690,673 B1 | 2/2004 | Jarvis |
| 6,698,756 B1 | 3/2004 | Baker et al. |
| 6,698,759 B2 | 3/2004 | Webb et al. |
| 6,702,289 B1 | 3/2004 | Feola |
| 6,702,290 B2 | 3/2004 | Buono-Correa et al. |
| 6,709,333 B1 | 3/2004 | Bradford et al. |
| 6,712,696 B2 | 3/2004 | Soltys et al. |
| 6,719,288 B2 | 4/2004 | Hessing et al. |
| 6,719,634 B2 | 4/2004 | Mishina et al. |
| 6,722,974 B2 | 4/2004 | Sines et al. |
| 6,726,205 B1 | 4/2004 | Purton |
| 6,732,067 B1 | 5/2004 | Powderly |
| 6,733,012 B2 | 5/2004 | Bui et al. |
| 6,733,388 B2 | 5/2004 | Mothwurf |
| 6,746,333 B1 | 6/2004 | Onda et al. |
| 6,747,560 B2 | 6/2004 | Stevens, III |
| 6,749,510 B2 | 6/2004 | Giobbi |
| 6,758,751 B2 | 7/2004 | Soltys et al. |
| 6,758,757 B2 | 7/2004 | Luciano, Jr. et al. |
| 6,769,693 B2 | 8/2004 | Huard et al. |
| 6,774,782 B2 | 8/2004 | Runyon et al. |
| 6,789,801 B2 | 9/2004 | Snow |
| 6,802,510 B1 | 10/2004 | Haber |
| 6,804,763 B1 | 10/2004 | Stockdale et al. |
| 6,808,173 B2 | 10/2004 | Snow |
| 6,827,282 B2 | 12/2004 | Silverbrook |
| 6,834,251 B1 | 12/2004 | Fletcher |
| 6,840,517 B2 | 1/2005 | Snow |
| 6,842,263 B1 | 1/2005 | Saeki |
| 6,843,725 B2 | 1/2005 | Nelson |
| 6,848,616 B2 | 2/2005 | Tsirline et al. |
| 6,848,844 B2 | 2/2005 | McCue, Jr. et al. |
| 6,848,994 B1 | 2/2005 | Knust et al. |
| 6,857,961 B2 | 2/2005 | Soltys et al. |
| 6,874,784 B1 | 4/2005 | Promutico |
| 6,874,786 B2 | 4/2005 | Bruno |
| 6,877,657 B2 | 4/2005 | Ranard et al. |
| 6,877,748 B1 | 4/2005 | Patroni |
| 6,889,979 B2 | 5/2005 | Blaha et al. |
| 6,893,347 B1 | 5/2005 | Zilliacus et al. |
| 6,899,628 B2 | 5/2005 | Leen et al. |
| 6,902,167 B2 | 6/2005 | Webb |
| 6,905,121 B1 | 6/2005 | Timpano |
| 6,923,446 B2 | 8/2005 | Snow |
| 6,938,900 B2 | 9/2005 | Snow |
| 6,941,180 B1 | 9/2005 | Fischer et al. |
| 6,950,948 B2 | 9/2005 | Neff |
| 6,955,599 B2 | 10/2005 | Bourbour et al. |
| 6,957,746 B2 | 10/2005 | Martin et al. |
| 6,959,925 B1 | 11/2005 | Baker et al. |
| 6,959,935 B2 | 11/2005 | Buhl et al. |
| 6,960,134 B2 | 11/2005 | Hartl et al. |
| 6,964,612 B2 | 11/2005 | Soltys et al. |
| 6,986,514 B2 | 1/2006 | Snow |
| 6,988,516 B2 | 1/2006 | Debaes et al. |
| 7,011,309 B2 | 3/2006 | Soltys et al. |
| 7,020,307 B2 | 3/2006 | Hinton et al. |
| 7,028,598 B2 | 4/2006 | Teshima |
| 7,029,009 B2 | 4/2006 | Grauzer et al. |
| 7,036,818 B2 | 5/2006 | Grauzer et al. |
| 7,046,458 B2 | 5/2006 | Nakayama |
| 7,046,764 B1 | 5/2006 | Kump |
| 7,048,629 B2 | 5/2006 | Sines et al. |
| 7,059,602 B2 | 6/2006 | Grauzer et al. |
| 7,066,464 B2 | 6/2006 | Blad et al. |

(56) References Cited

U.S. PATENT DOCUMENTS

| | | |
|---|---|---|
| 7,068,822 B2 | 6/2006 | Scott |
| 7,073,791 B2 | 7/2006 | Grauzer et al. |
| 7,084,769 B2 | 8/2006 | Bauer et al. |
| 7,089,420 B1 | 8/2006 | Durst et al. |
| 7,106,201 B2 | 9/2006 | Tuttle |
| 7,113,094 B2 | 9/2006 | Garber et al. |
| 7,114,718 B2 | 10/2006 | Grauzer et al. |
| 7,124,947 B2 | 10/2006 | Storch |
| 7,128,652 B1 | 10/2006 | Lavoie et al. |
| 7,137,627 B2 | 11/2006 | Grauzer et al. |
| 7,139,108 B2 | 11/2006 | Andersen et al. |
| 7,140,614 B2 | 11/2006 | Snow |
| 7,162,035 B1 | 1/2007 | Durst et al. |
| 7,165,769 B2 | 1/2007 | Crenshaw et al. |
| 7,165,770 B2 | 1/2007 | Snow |
| 7,175,522 B2 | 2/2007 | Hartl |
| 7,186,181 B2 | 3/2007 | Rowe |
| 7,201,656 B2 | 4/2007 | Darder |
| 7,202,888 B2 | 4/2007 | Tecu et al. |
| 7,203,841 B2 | 4/2007 | Jackson et al. |
| 7,213,812 B2 | 5/2007 | Schubert et al. |
| 7,222,852 B2 | 5/2007 | Soltys et al. |
| 7,222,855 B2 | 5/2007 | Sorge |
| 7,231,812 B1 | 6/2007 | Lagare |
| 7,234,698 B2 | 6/2007 | Grauzer et al. |
| 7,237,969 B2 | 7/2007 | Bartman |
| 7,243,148 B2 | 7/2007 | Keir et al. |
| 7,243,698 B2 | 7/2007 | Siegel |
| 7,246,799 B2 | 7/2007 | Snow |
| 7,255,344 B2 | 8/2007 | Grauzer et al. |
| 7,255,351 B2 | 8/2007 | Yoseloff et al. |
| 7,255,642 B2 | 8/2007 | Sines et al. |
| 7,257,630 B2 | 8/2007 | Cole et al. |
| 7,261,294 B2 | 8/2007 | Grauzer et al. |
| 7,264,241 B2 | 9/2007 | Schubert et al. |
| 7,264,243 B2 | 9/2007 | Yoseloff et al. |
| 7,277,570 B2 | 10/2007 | Armstrong |
| 7,278,923 B2 | 10/2007 | Grauzer et al. |
| 7,294,056 B2 | 11/2007 | Lowell et al. |
| 7,297,062 B2 | 11/2007 | Gatto et al. |
| 7,300,056 B2 | 11/2007 | Gioia et al. |
| 7,303,473 B2 | 12/2007 | Rowe |
| 7,309,065 B2 | 12/2007 | Yoseloff et al. |
| 7,316,609 B2 | 1/2008 | Dunn et al. |
| 7,316,615 B2 | 1/2008 | Soltys et al. |
| 7,322,576 B2 | 1/2008 | Grauzer et al. |
| 7,331,579 B2 | 2/2008 | Snow |
| 7,334,794 B2 | 2/2008 | Snow |
| 7,338,044 B2 | 3/2008 | Grauzer et al. |
| 7,338,362 B1 | 3/2008 | Gallagher |
| 7,341,510 B2 | 3/2008 | Bourbour et al. |
| 7,357,321 B2 | 4/2008 | Yoshida et al. |
| 7,360,094 B2 | 4/2008 | Neff |
| 7,367,561 B2 | 5/2008 | Blaha et al. |
| 7,367,563 B2 | 5/2008 | Yoseloff et al. |
| 7,367,884 B2 | 5/2008 | Breeding et al. |
| 7,374,170 B2 | 5/2008 | Grauzer et al. |
| 7,384,044 B2 | 6/2008 | Grauzer et al. |
| 7,387,300 B2 | 6/2008 | Snow |
| 7,389,990 B2 | 6/2008 | Mourad |
| 7,390,256 B2 | 6/2008 | Soltys et al. |
| 7,399,226 B2 | 7/2008 | Mishra |
| 7,407,438 B2 | 8/2008 | Schubert et al. |
| 7,413,191 B2 | 8/2008 | Grauzer et al. |
| 7,434,805 B2 | 10/2008 | Grauzer et al. |
| 7,436,957 B1 | 10/2008 | Fischer et al. |
| 7,448,626 B2 | 11/2008 | Fleckenstein |
| 7,458,582 B2 | 12/2008 | Snow et al. |
| 7,461,843 B1 | 12/2008 | Baker et al. |
| 7,464,932 B2 | 12/2008 | Darling |
| 7,464,934 B2 | 12/2008 | Schwartz |
| 7,472,906 B2 | 1/2009 | Shai |
| 7,500,672 B2 | 3/2009 | Ho |
| 7,506,874 B2 | 3/2009 | Hall |
| 7,510,186 B2 | 3/2009 | Fleckenstein |
| 7,510,190 B2 | 3/2009 | Snow et al. |
| 7,510,194 B2 | 3/2009 | Soltys et al. |
| 7,510,478 B2 | 3/2009 | Benbrahim et al. |
| 7,513,437 B2 | 4/2009 | Douglas |
| 7,515,718 B2 | 4/2009 | Nguyen et al. |
| 7,523,935 B2 | 4/2009 | Grauzer et al. |
| 7,523,936 B2 | 4/2009 | Grauzer et al. |
| 7,523,937 B2 | 4/2009 | Fleckenstein |
| 7,525,510 B2 | 4/2009 | Beland et al. |
| 7,537,216 B2 | 5/2009 | Soltys et al. |
| 7,540,497 B2 | 6/2009 | Tseng |
| 7,540,498 B2 | 6/2009 | Crenshaw et al. |
| 7,549,643 B2 | 6/2009 | Quach |
| 7,554,753 B2 | 6/2009 | Wakamiya |
| 7,556,197 B2 | 7/2009 | Yoshida et al. |
| 7,556,266 B2 | 7/2009 | Blaha et al. |
| 7,575,237 B2 | 8/2009 | Snow |
| 7,578,506 B2 | 8/2009 | Lambert |
| 7,584,962 B2 | 9/2009 | Breeding et al. |
| 7,584,963 B2 | 9/2009 | Krenn et al. |
| 7,584,966 B2 | 9/2009 | Snow |
| 7,591,728 B2 | 9/2009 | Gioia et al. |
| 7,593,544 B2 | 9/2009 | Downs, III et al. |
| 7,594,660 B2 | 9/2009 | Baker et al. |
| 7,597,623 B2 | 10/2009 | Grauzer et al. |
| 7,644,923 B1 | 1/2010 | Dickinson et al. |
| 7,661,676 B2 | 2/2010 | Smith et al. |
| 7,666,090 B2 | 2/2010 | Hettinger |
| 7,669,852 B2 | 3/2010 | Baker et al. |
| 7,669,853 B2 | 3/2010 | Jones |
| 7,677,565 B2 | 3/2010 | Grauzer et al. |
| 7,677,566 B2 | 3/2010 | Krenn et al. |
| 7,686,681 B2 | 3/2010 | Soltys et al. |
| 7,699,694 B2 | 4/2010 | Hill |
| 7,735,657 B2 | 6/2010 | Johnson |
| 7,740,244 B2 | 6/2010 | Ho |
| 7,744,452 B2 | 6/2010 | Cimring et al. |
| 7,753,373 B2 | 7/2010 | Grauzer et al. |
| 7,753,374 B2 | 7/2010 | Ho |
| 7,753,798 B2 | 7/2010 | Soltys et al. |
| 7,762,554 B2 | 7/2010 | Ho |
| 7,764,836 B2 | 7/2010 | Downs, III et al. |
| 7,766,332 B2 | 8/2010 | Grauzer et al. |
| 7,766,333 B1 | 8/2010 | Stardust et al. |
| 7,769,232 B2 | 8/2010 | Downs, III |
| 7,769,853 B2 | 8/2010 | Nezamzadeh |
| 7,773,749 B1 | 8/2010 | Durst et al. |
| 7,780,529 B2 | 8/2010 | Rowe et al. |
| 7,784,790 B2 | 8/2010 | Grauzer et al. |
| 7,804,982 B2 | 9/2010 | Howard et al. |
| 7,846,020 B2 | 12/2010 | Walker et al. |
| 7,867,080 B2 | 1/2011 | Nicely et al. |
| 7,890,365 B2 | 2/2011 | Hettinger |
| 7,900,923 B2 | 3/2011 | Toyama et al. |
| 7,901,285 B2 | 3/2011 | Tran et al. |
| 7,908,169 B2 | 3/2011 | Hettinger |
| 7,909,689 B2 | 3/2011 | Lardie |
| 7,931,533 B2 | 4/2011 | LeMay et al. |
| 7,933,448 B2 | 4/2011 | Downs, III |
| 7,946,586 B2 | 5/2011 | Krenn et al. |
| 7,967,294 B2 | 6/2011 | Blaha et al. |
| 7,976,023 B1 | 7/2011 | Hessing et al. |
| 7,988,152 B2 | 8/2011 | Sines |
| 7,988,554 B2 | 8/2011 | LeMay et al. |
| 7,995,196 B1 | 8/2011 | Fraser |
| 8,002,638 B2 | 8/2011 | Grauzer et al. |
| 8,011,661 B2 | 9/2011 | Stasson |
| 8,016,663 B2 | 9/2011 | Soltys et al. |
| 8,021,231 B2 | 9/2011 | Walker et al. |
| 8,025,294 B2 | 9/2011 | Grauzer et al. |
| 8,038,521 B2 | 10/2011 | Grauzer et al. |
| RE42,944 E | 11/2011 | Blaha et al. |
| 8,057,302 B2 | 11/2011 | Wells et al. |
| 8,062,134 B2 | 11/2011 | Kelly et al. |
| 8,070,574 B2 | 12/2011 | Grauzer et al. |
| 8,092,307 B2 | 1/2012 | Kelly |
| 8,092,309 B2 | 1/2012 | Bickley |
| 8,141,875 B2 | 3/2012 | Grauzer et al. |
| 8,150,158 B2 | 4/2012 | Downs, III |

(56) References Cited

U.S. PATENT DOCUMENTS

| | | |
|---|---|---|
| 8,171,567 B1 | 5/2012 | Fraser et al. |
| 8,210,536 B2 | 7/2012 | Blaha et al. |
| 8,221,244 B2 | 7/2012 | French |
| 8,251,293 B2 | 8/2012 | Nagata et al. |
| 8,267,404 B2 | 9/2012 | Grauzer et al. |
| 8,270,603 B1 | 9/2012 | Durst et al. |
| 8,287,347 B2 | 10/2012 | Snow et al. |
| 8,287,386 B2 | 10/2012 | Miller et al. |
| 8,319,666 B2 | 11/2012 | Weinmann et al. |
| 8,337,296 B2 | 12/2012 | Grauzer et al. |
| 8,342,525 B2 | 1/2013 | Scheper et al. |
| 8,342,526 B1 | 1/2013 | Sampson et al. |
| 8,342,529 B2 | 1/2013 | Snow |
| 8,353,513 B2 | 1/2013 | Swanson |
| 8,381,918 B2 | 2/2013 | Johnson |
| 8,419,521 B2 | 4/2013 | Grauzer et al. |
| 8,444,147 B2 | 5/2013 | Grauzer et al. |
| 8,469,360 B2 | 6/2013 | Sines |
| 8,480,088 B2 | 7/2013 | Toyama et al. |
| 8,485,527 B2 | 7/2013 | Sampson et al. |
| 8,490,973 B2 | 7/2013 | Yoseloff et al. |
| 8,498,444 B2 | 7/2013 | Sharma |
| 8,505,916 B2 | 8/2013 | Grauzer et al. |
| 8,511,684 B2 | 8/2013 | Grauzer et al. |
| 8,556,263 B2 | 10/2013 | Grauzer et al. |
| 8,579,289 B2 | 11/2013 | Rynda et al. |
| 8,616,552 B2 * | 12/2013 | Czyzewski et al. ....... 273/149 R |
| 8,628,086 B2 | 1/2014 | Krenn et al. |
| 8,662,500 B2 | 3/2014 | Swanson |
| 8,695,978 B1 | 4/2014 | Ho |
| 8,702,100 B2 | 4/2014 | Snow et al. |
| 8,702,101 B2 | 4/2014 | Scheper et al. |
| 8,720,891 B2 | 5/2014 | Hessing et al. |
| 8,758,111 B2 | 6/2014 | Lutnick |
| 8,777,710 B2 | 7/2014 | Grauzer et al. |
| 8,820,745 B2 | 9/2014 | Grauzer et al. |
| 8,899,587 B2 | 12/2014 | Grauzer et al. |
| 8,919,775 B2 | 12/2014 | Wadds et al. |
| 2001/0036231 A1 | 11/2001 | Easwar et al. |
| 2001/0036866 A1 | 11/2001 | Stockdale et al. |
| 2002/0017481 A1 | 2/2002 | Johnson et al. |
| 2002/0030425 A1 | 3/2002 | Tiramani et al. |
| 2002/0045478 A1 | 4/2002 | Soltys et al. |
| 2002/0045481 A1 | 4/2002 | Soltys et al. |
| 2002/0063389 A1 | 5/2002 | Breeding et al. |
| 2002/0068635 A1 | 6/2002 | Hill |
| 2002/0070499 A1 | 6/2002 | Breeding et al. |
| 2002/0094869 A1 | 7/2002 | Harkham |
| 2002/0107067 A1 | 8/2002 | McGlone et al. |
| 2002/0107072 A1 | 8/2002 | Giobbi |
| 2002/0113368 A1 | 8/2002 | Hessing et al. |
| 2002/0135692 A1 | 9/2002 | Fujinawa |
| 2002/0142820 A1 | 10/2002 | Bartlett |
| 2002/0155869 A1 | 10/2002 | Soltys et al. |
| 2002/0163125 A1 | 11/2002 | Grauzer et al. |
| 2002/0187821 A1 | 12/2002 | Soltys et al. |
| 2002/0187830 A1 | 12/2002 | Stockdale et al. |
| 2003/0003997 A1 | 1/2003 | Vuong et al. |
| 2003/0007143 A1 | 1/2003 | McArthur et al. |
| 2003/0047870 A1 | 3/2003 | Blaha et al. |
| 2003/0048476 A1 | 3/2003 | Yamakawa |
| 2003/0052449 A1 | 3/2003 | Grauzer et al. |
| 2003/0052450 A1 | 3/2003 | Grauzer et al. |
| 2003/0064798 A1 | 4/2003 | Grauzer et al. |
| 2003/0067112 A1 | 4/2003 | Grauzer et al. |
| 2003/0071413 A1 | 4/2003 | Blaha et al. |
| 2003/0073498 A1 | 4/2003 | Grauzer et al. |
| 2003/0075865 A1 | 4/2003 | Grauzer et al. |
| 2003/0075866 A1 | 4/2003 | Blaha et al. |
| 2003/0087694 A1 | 5/2003 | Storch |
| 2003/0090059 A1 | 5/2003 | Grauzer et al. |
| 2003/0094756 A1 | 5/2003 | Grauzer et al. |
| 2003/0151194 A1 | 8/2003 | Hessing et al. |
| 2003/0195025 A1 | 10/2003 | Hill |
| 2004/0015423 A1 | 1/2004 | Walker et al. |
| 2004/0036214 A1 | 2/2004 | Baker et al. |
| 2004/0067789 A1 | 4/2004 | Grauzer et al. |
| 2004/0100026 A1 | 5/2004 | Haggard |
| 2004/0108654 A1 | 6/2004 | Grauzer et al. |
| 2004/0116179 A1 | 6/2004 | Nicely et al. |
| 2004/0169332 A1 | 9/2004 | Grauzer et al. |
| 2004/0180722 A1 | 9/2004 | Giobbi |
| 2004/0224777 A1 | 11/2004 | Smith et al. |
| 2004/0245720 A1 | 12/2004 | Grauzer et al. |
| 2004/0259618 A1 | 12/2004 | Soltys et al. |
| 2005/0012671 A1 | 1/2005 | Bisig |
| 2005/0023752 A1 | 2/2005 | Grauzer et al. |
| 2005/0026680 A1 | 2/2005 | Gururajan |
| 2005/0035548 A1 | 2/2005 | Yoseloff et al. |
| 2005/0037843 A1 | 2/2005 | Wells et al. |
| 2005/0040594 A1 | 2/2005 | Krenn et al. |
| 2005/0051955 A1 | 3/2005 | Schubert et al. |
| 2005/0051965 A1 | 3/2005 | Gururajan |
| 2005/0062227 A1 | 3/2005 | Grauzer et al. |
| 2005/0062228 A1 | 3/2005 | Grauzer et al. |
| 2005/0062229 A1 | 3/2005 | Grauzer et al. |
| 2005/0082750 A1 | 4/2005 | Grauzer et al. |
| 2005/0093231 A1 | 5/2005 | Grauzer et al. |
| 2005/0104289 A1 | 5/2005 | Grauzer et al. |
| 2005/0104290 A1 | 5/2005 | Grauzer et al. |
| 2005/0110210 A1 | 5/2005 | Soltys et al. |
| 2005/0113166 A1 | 5/2005 | Grauzer et al. |
| 2005/0113171 A1 | 5/2005 | Hodgson |
| 2005/0119048 A1 | 6/2005 | Soltys et al. |
| 2005/0137005 A1 | 6/2005 | Soltys et al. |
| 2005/0140090 A1 | 6/2005 | Breeding et al. |
| 2005/0146093 A1 | 7/2005 | Grauzer et al. |
| 2005/0148391 A1 | 7/2005 | Tain |
| 2005/0192092 A1 | 9/2005 | Breckner et al. |
| 2005/0206077 A1 | 9/2005 | Grauzer et al. |
| 2005/0242500 A1 | 11/2005 | Downs |
| 2005/0272501 A1 | 12/2005 | Tran et al. |
| 2005/0288083 A1 | 12/2005 | Downs |
| 2005/0288086 A1 | 12/2005 | Schubert et al. |
| 2006/0027970 A1 | 2/2006 | Kyrychenko |
| 2006/0033269 A1 | 2/2006 | Grauzer et al. |
| 2006/0033270 A1 | 2/2006 | Grauzer et al. |
| 2006/0046853 A1 | 3/2006 | Black |
| 2006/0063577 A1 | 3/2006 | Downs et al. |
| 2006/0066048 A1 | 3/2006 | Krenn et al. |
| 2006/0181022 A1 | 8/2006 | Grauzer et al. |
| 2006/0183540 A1 | 8/2006 | Grauzer et al. |
| 2006/0189381 A1 | 8/2006 | Daniel et al. |
| 2006/0199649 A1 | 9/2006 | Soltys et al. |
| 2006/0205508 A1 | 9/2006 | Green |
| 2006/0220312 A1 | 10/2006 | Baker et al. |
| 2006/0220313 A1 | 10/2006 | Baker et al. |
| 2006/0252521 A1 | 11/2006 | Gururajan et al. |
| 2006/0252554 A1 | 11/2006 | Gururajan et al. |
| 2006/0279040 A1 | 12/2006 | Downs et al. |
| 2006/0281534 A1 | 12/2006 | Grauzer et al. |
| 2007/0001395 A1 | 1/2007 | Gioia et al. |
| 2007/0006708 A1 | 1/2007 | Laakso |
| 2007/0015583 A1 | 1/2007 | Tran |
| 2007/0018389 A1 | 1/2007 | Downs |
| 2007/0045959 A1 | 3/2007 | Soltys |
| 2007/0049368 A1 | 3/2007 | Kuhn et al. |
| 2007/0057469 A1 | 3/2007 | Grauzer et al. |
| 2007/0066387 A1 | 3/2007 | Matsuno et al. |
| 2007/0069462 A1 | 3/2007 | Downs et al. |
| 2007/0072677 A1 | 3/2007 | Lavoie et al. |
| 2007/0102879 A1 | 5/2007 | Stasson |
| 2007/0111773 A1 | 5/2007 | Gururajan et al. |
| 2007/0184905 A1 | 8/2007 | Gatto et al. |
| 2007/0197294 A1 | 8/2007 | Gong |
| 2007/0197298 A1 | 8/2007 | Rowe |
| 2007/0202941 A1 | 8/2007 | Miltenberger et al. |
| 2007/0222147 A1 | 9/2007 | Blaha et al. |
| 2007/0225055 A1 | 9/2007 | Weisman |
| 2007/0233567 A1 | 10/2007 | Daly |
| 2007/0238506 A1 | 10/2007 | Ruckle |
| 2007/0259709 A1 | 11/2007 | Kelly et al. |
| 2007/0267812 A1 | 11/2007 | Grauzer et al. |
| 2007/0272600 A1 | 11/2007 | Johnson |

(56) References Cited

U.S. PATENT DOCUMENTS

| | | |
|---|---|---|
| 2007/0278739 A1 | 12/2007 | Swanson |
| 2007/0290438 A1 | 12/2007 | Grauzer et al. |
| 2008/0006997 A1 | 1/2008 | Scheper et al. |
| 2008/0006998 A1* | 1/2008 | Grauzer et al. .......... 273/149 R |
| 2008/0022415 A1 | 1/2008 | Kuo et al. |
| 2008/0032763 A1 | 2/2008 | Giobbi |
| 2008/0039192 A1 | 2/2008 | Laut |
| 2008/0039208 A1 | 2/2008 | Abrink et al. |
| 2008/0096656 A1 | 4/2008 | LeMay et al. |
| 2008/0111300 A1 | 5/2008 | Czyzewski et al. |
| 2008/0113700 A1 | 5/2008 | Czyzewski et al. |
| 2008/0113783 A1 | 5/2008 | Czyzewski et al. |
| 2008/0136108 A1 | 6/2008 | Polay |
| 2008/0143048 A1 | 6/2008 | Shigeta |
| 2008/0176627 A1 | 7/2008 | Lardie |
| 2008/0217218 A1 | 9/2008 | Johnson |
| 2008/0234046 A1 | 9/2008 | Kinsley |
| 2008/0234047 A1 | 9/2008 | Nguyen |
| 2008/0248875 A1 | 10/2008 | Beatty |
| 2008/0284096 A1 | 11/2008 | Toyama et al. |
| 2008/0303210 A1 | 12/2008 | Grauzer et al. |
| 2008/0315517 A1 | 12/2008 | Toyama |
| 2009/0026700 A2 | 1/2009 | Shigeta |
| 2009/0048026 A1 | 2/2009 | French |
| 2009/0054161 A1 | 2/2009 | Schubert et al. |
| 2009/0072477 A1 | 3/2009 | Tseng |
| 2009/0091078 A1 | 4/2009 | Grauzer et al. |
| 2009/0100409 A1 | 4/2009 | Toneguzzo |
| 2009/0104963 A1 | 4/2009 | Burman |
| 2009/0121429 A1 | 5/2009 | Walsh |
| 2009/0140492 A1 | 6/2009 | Yoseloff et al. |
| 2009/0166970 A1 | 7/2009 | Rosh |
| 2009/0176547 A1 | 7/2009 | Katz |
| 2009/0179378 A1 | 7/2009 | Amaitis et al. |
| 2009/0186676 A1 | 7/2009 | Amaitis et al. |
| 2009/0189346 A1 | 7/2009 | Krenn et al. |
| 2009/0191933 A1 | 7/2009 | French |
| 2009/0194988 A1 | 8/2009 | Wright et al. |
| 2009/0197662 A1 | 8/2009 | Wright et al. |
| 2009/0224476 A1 | 9/2009 | Grauzer et al. |
| 2009/0227318 A1 | 9/2009 | Wright et al. |
| 2009/0227360 A1 | 9/2009 | Gioia et al. |
| 2009/0250873 A1 | 10/2009 | Jones |
| 2009/0253478 A1 | 10/2009 | Walker et al. |
| 2009/0253503 A1 | 10/2009 | Krise et al. |
| 2009/0267296 A1 | 10/2009 | Ho |
| 2009/0267297 A1 | 10/2009 | Blaha et al. |
| 2009/0283969 A1 | 11/2009 | Tseng |
| 2009/0298577 A1 | 12/2009 | Gagner et al. |
| 2009/0302535 A1 | 12/2009 | Ho |
| 2009/0302537 A1 | 12/2009 | Ho |
| 2009/0312093 A1 | 12/2009 | Walker et al. |
| 2009/0314188 A1 | 12/2009 | Toyama et al. |
| 2010/0013152 A1 | 1/2010 | Grauzer et al. |
| 2010/0038849 A1 | 2/2010 | Scheper et al. |
| 2010/0048304 A1 | 2/2010 | Boesen |
| 2010/0069155 A1 | 3/2010 | Schwartz et al. |
| 2010/0178987 A1 | 7/2010 | Pacey |
| 2010/0197410 A1 | 8/2010 | Leen et al. |
| 2010/0234110 A1 | 9/2010 | Clarkson |
| 2010/0240440 A1 | 9/2010 | Szrek et al. |
| 2010/0244376 A1 | 9/2010 | Johnson |
| 2010/0244382 A1 | 9/2010 | Snow |
| 2010/0252992 A1 | 10/2010 | Sines |
| 2010/0255899 A1 | 10/2010 | Paulsen |
| 2010/0276880 A1 | 11/2010 | Grauzer et al. |
| 2010/0311493 A1 | 12/2010 | Miller et al. |
| 2010/0311494 A1 | 12/2010 | Miller et al. |
| 2010/0314830 A1 | 12/2010 | Grauzer et al. |
| 2010/0320685 A1 | 12/2010 | Grauzer et al. |
| 2011/0006480 A1 | 1/2011 | Grauzer et al. |
| 2011/0012303 A1 | 1/2011 | Kourgiantakis et al. |
| 2011/0024981 A1 | 2/2011 | Tseng |
| 2011/0052049 A1 | 3/2011 | Rajaraman et al. |
| 2011/0062662 A1 | 3/2011 | Ohta et al. |
| 2011/0078096 A1 | 3/2011 | Bounds |
| 2011/0105208 A1 | 5/2011 | Bickley |
| 2011/0109042 A1 | 5/2011 | Rynda et al. |
| 2011/0130185 A1 | 6/2011 | Walker |
| 2011/0130190 A1 | 6/2011 | Hamman et al. |
| 2011/0159952 A1 | 6/2011 | Kerr |
| 2011/0159953 A1 | 6/2011 | Kerr |
| 2011/0165936 A1 | 7/2011 | Kerr |
| 2011/0172008 A1 | 7/2011 | Alderucci |
| 2011/0183748 A1 | 7/2011 | Wilson et al. |
| 2011/0230268 A1 | 9/2011 | Williams |
| 2011/0269529 A1 | 11/2011 | Baerlocher |
| 2011/0272881 A1 | 11/2011 | Sines |
| 2011/0285081 A1 | 11/2011 | Stasson |
| 2011/0287829 A1 | 11/2011 | Clarkson et al. |
| 2012/0015724 A1 | 1/2012 | Ocko et al. |
| 2012/0015725 A1 | 1/2012 | Ocko et al. |
| 2012/0015743 A1 | 1/2012 | Lam et al. |
| 2012/0015747 A1 | 1/2012 | Ocko et al. |
| 2012/0021835 A1 | 1/2012 | Keller et al. |
| 2012/0034977 A1 | 2/2012 | Kammler |
| 2012/0062745 A1 | 3/2012 | Han et al. |
| 2012/0074646 A1 | 3/2012 | Grauzer et al. |
| 2012/0091656 A1 | 4/2012 | Blaha et al. |
| 2012/0095982 A1 | 4/2012 | Lennington et al. |
| 2012/0161393 A1 | 6/2012 | Krenn et al. |
| 2012/0175841 A1 | 7/2012 | Grauzer et al. |
| 2012/0181747 A1 | 7/2012 | Grauzer et al. |
| 2012/0187625 A1 | 7/2012 | Downs, III et al. |
| 2012/0242782 A1 | 9/2012 | Huang |
| 2012/0286471 A1 | 11/2012 | Grauzer et al. |
| 2012/0306152 A1 | 12/2012 | Krishnamurty et al. |
| 2013/0020761 A1 | 1/2013 | Sines et al. |
| 2013/0085638 A1 | 4/2013 | Weinmann et al. |
| 2013/0099448 A1 | 4/2013 | Scheper et al. |
| 2013/0109455 A1 | 5/2013 | Grauzer et al. |
| 2013/0132306 A1 | 5/2013 | Kami et al. |
| 2013/0161905 A1 | 6/2013 | Grauzer et al. |
| 2013/0228972 A1 | 9/2013 | Grauzer et al. |
| 2013/0300059 A1 | 11/2013 | Sampson et al. |
| 2013/0337922 A1 | 12/2013 | Kuhn |
| 2014/0027979 A1 | 1/2014 | Stasson et al. |
| 2014/0094239 A1 | 4/2014 | Grauzer et al. |
| 2014/0103606 A1 | 4/2014 | Grauzer et al. |
| 2014/0138907 A1 | 5/2014 | Rynda et al. |
| 2014/0145399 A1 | 5/2014 | Krenn et al. |
| 2014/0171170 A1 | 6/2014 | Krishnamurty et al. |
| 2014/0175724 A1 | 6/2014 | Huhtala et al. |
| 2014/0183818 A1 | 7/2014 | Czyzewski et al. |

FOREIGN PATENT DOCUMENTS

| | | |
|---|---|---|
| AU | 757636 B2 | 2/2003 |
| CA | 2266555 A1 | 4/1998 |
| CA | 2284017 A1 | 9/1998 |
| CA | 2612138 A1 | 12/2006 |
| CN | 2848303 Y | 12/2006 |
| CN | 101127131 A | 2/2008 |
| CN | 201139926 Y | 10/2008 |
| CN | 202983149 U | 6/2013 |
| CZ | 24952 U1 | 2/2013 |
| DE | 672616 C | 3/1939 |
| DE | 2757341 A1 | 6/1978 |
| DE | 3807127 A1 | 9/1989 |
| EP | 777514 A1 | 2/2000 |
| EP | 1194888 A1 | 4/2002 |
| EP | 1 502 631 A1 | 2/2005 |
| EP | 1713026 A1 | 10/2006 |
| EP | 1575261 B1 | 8/2012 |
| FR | 2375918 A1 | 7/1978 |
| GB | 414014 A | 7/1934 |
| GB | 0337147 A | 10/1980 |
| JP | 10063933 A | 3/1998 |
| JP | 11045321 A | 2/1999 |
| JP | 2000251031 A | 9/2000 |
| JP | 2001327647 A | 11/2001 |
| JP | 2002165916 A | 6/2002 |
| JP | 2003250950 A | 9/2003 |
| JP | 2005198668 A | 7/2005 |

(56) References Cited

FOREIGN PATENT DOCUMENTS

| | | | |
|---|---|---|---|
| JP | 2008246061 A | 10/2008 |
| WO | 8700764 | 2/1987 |
| WO | 9221413 A1 | 12/1992 |
| WO | 9528210 A1 | 10/1995 |
| WO | 9607153 A1 | 3/1996 |
| WO | 97/10577 | 3/1997 |
| WO | 9710577 A1 | 3/1997 |
| WO | 9840136 | 9/1998 |
| WO | 9943404 | 9/1999 |
| WO | 9943404 A1 | 9/1999 |
| WO | 9952610 A1 | 10/1999 |
| WO | 9952611 A1 | 10/1999 |
| WO | 0051076 | 8/2000 |
| WO | 0156670 A1 | 8/2001 |
| WO | 0205914 A1 | 1/2002 |
| WO | 2004067889 A1 | 8/2004 |
| WO | 2004112923 A1 | 12/2004 |
| WO | 20041112923 A1 | 12/2004 |
| WO | 2006039308 A2 | 4/2006 |
| WO | 2008/005286 A2 | 1/2008 |
| WO | 2008005286 A2 | 1/2008 |
| WO | 2008006023 A2 | 1/2008 |
| WO | 2009137541 A2 | 11/2009 |
| WO | 2010001032 A1 | 1/2010 |
| WO | 2010055328 A1 | 5/2010 |
| WO | 2010117446 A1 | 10/2010 |
| WO | 2013019677 A1 | 2/2013 |

OTHER PUBLICATIONS

International Search Report for International Application No. PCT/US2007/022858, mailed Apr. 18, 2008, 2 pages.
Notification of Transmittal of International Preliminary Examination Report for corresponding International Application No. PCT/US02131105 filed Sep. 27, 2002.
PCT International Search Report for PCT/US20071022894, dated Jun. 11, 2008, 2 pages.
Shuffle Master Gaming, Service Manual, Ace™ Single Deck Card Shuffler, 63 pages, © 1998.
Shuffle Master Gaming, Service Manual, Let It Ride Bonus® With Universal Keypad, 112 pages, © 2000 Shuffle Master, Inc.
Written Opinion of the International Searching Authority for International Application No. PCT/US2007/022858, mailed Apr. 18, 2008, 5 pages.
PCT International Search Report and Written Opinion, PCT Application No. PCT/US20131062391, Dec. 17, 2013, 13 pages.
"ACE, Single Deck Shuffler," Shuffle Master, Inc., (2005), 2 pages.
"Automatic casino card shuffle," Alibaba.com, (last visited 22 Jul. 2014), 2 pages.
"Error Back propagation," http://willamette.edu~gorr/classes/cs449/backprop.html (4 pages), Nov. 13, 2008.
"i-Deal," Bally Technologies, Inc., (2014), 2 pages.
"shufflers—SHFL entertainment," Gaming Concepts Group, (2012), 6 pages.
"TAG Archives: Shuffle Machine," Gee Wiz Online, (Mar. 25, 2013), 4 pages.
1/3" B/W CCD Camera Module EB100 by EverFocus Electronics Corp., Jul. 31, 2001, 3 pgs.
Canadian Office Action for CA 2,580,309 dated Mar. 20, 2012 (6 pages).
Christos Stergiou and Dimitrios Siganos, "Neural Networks," http://www.doc.ic.ac.uk/~nd/surprise_96/journal/vol4/cs11/report.html (13 pages), Dec 15, 2011.
Genevieve Orr, CS-449: Neural Networks Willamette University, http://www.willamette.edu/~gorr/classes/cs449/intro.html (4 pages), Fall 1999.
Litwiller, Dave, CCD vs. CMOS: Facts and Fiction reprinted from Jan. 2001 Issue of Photonics Spectra, Laurin Publishing Co. Inc. (4 pages).
PCT International Preliminary Report on Patentability of the International Searching Authority for PCT/US05/31400, dated Oct. 16, 2007, 7 pages.
PCT International Search Report and Written Opinion for PCT/US07/15036, dated Sep. 23, 2008, 3 pages.
PCT International Search Report and Written Opinion for PCT/US07/15035, dated Sep. 29, 2008, 3 pages.
PCT International Search Report and Written Opinion of the International Searching Authority for PCT/GB2011/051978, dated Jan. 17, 2012, 11 pages.
PCT International Search Report and Written Opinion of the International Searching Authority for PCT/IB2013/001756, dated Jan. 10, 2014, 7 pages.
PCT International Search Report and Written Opinion of the International Searching Authority for PCT/US11/59797, dated Mar. 27, 2012, 14 pages.
PCT International Search Report and Written Opinion of the International Searching Authority for PCT/US13/59665, dated Apr. 25, 2014, 21 pages.
PCT International Search Report and Written Opinion of the International Searching Authority for PCT/US2008/007069, dated Sep. 8, 2008, 10 pages.
PCT International Search Report and Written Opinion of the International Searching Authority for PCT/US2010/001032, dated Jun. 16, 2010, 11 pages.
PCT International Search Report and Written Opinion, PCT/US12/48706, Oct. 16, 2012, 12 pages.
PCT International Search Report for International Application No. PCT/US2003/015393, mailed Oct. 6, 2003.
PCT International Search Report and Written Opinion of the International Searching Authority for PCT/US05/31400, dated Sep. 25, 2007, 8 pages.
Scarne's Encyclopedia of Games by John Scarne, 1973, "Super Contract Bridge", p. 153.
Statement of Relevance of Cited References, Submitted as Part of a Third-Party Submission Under 37 CFR 1.290 on Dec. 7, 2012 (12 pages).
Tracking the Tables, by Jack Bularsky, Casino Journal, May 2004, vol. 17, No. 5, pp. 44-47.
PCT International Search Report and Written Opinion, PCT Application No. PCT/US2015/022158, Jun. 17, 2015, 13 pages.
European Patent Application Search Report—European Patent Application No. 06772987.1, Dec. 10, 2009, 5 pages.
Malaysian Patent Application Substantive Examination Adverse Report—Malaysian Patent Application Serial No. PI 20062710, May 9, 2009, 4 pages.
PCT International Preliminary Examination Report for International Patent Application No. PCT/US02/31105 dated Jul. 28, 2004, 9 pages.
PCT International Search Report and Written Opinion for International Patent Application No. PCT/US2006/22911, mailed Jun. 1, 2007, 6 pages.
PCT International Search Report for International Patent Application No. PCT/US2005/034737 mailed Apr. 7, 2006, 1 page.
Press Release for Alliance Gaming Corp., Jul 26, 2004—Alliance Gaming Announces Control with Galaxy Macau for New MindPlay Baccarat Table Technology, http://biz.yahoo.com/prnews, p. 1.
Singapore Patent Application Examination Report—Singapore Patent Application No. SE 2008 01914 A, Jun. 18, 2008, 9 pages.
Australian Provisional Patent Application for Australian Patent Application No. PM7441, filed Aug. 15, 1994, Applicants: Rodney G. Johnson et al., Title: Card Handling Apparatus, 13 pages.
Documents submitted in the case of *Shuffle Master, Inc. v. Card Austria, et al.*, Case No. CV-N-0508-HDM-(VPC) (Consolidated with Case No. CV-N-02-0244-ERC-(RAM)), May 6, 2003, Part 5 of 23 (Binder 3, 1 of 2), pp. 55-65, 100-109, 131-132, 185-186.

(56) References Cited

OTHER PUBLICATIONS

Documents submitted in the case of *Shuffle Master, Inc. v. Card Austria, et al.*, Case No. CV-N-0508-HDM-(VPC) (Consolidated with Case No. CV-N-02-0244-ERC-(RAM)), May 6, 2003, Part 7 of 23 (Binder 4, 1 of 2), pp. 67-80.

Documents submitted in the case of *Shuffle Master, Inc. v. Card Austria, et al.*, Case No. CV-N-0508-HDM-(VPC) (Consolidated with Case No. CV-N-02-0244-ERC-(RAM)), May 6, 2003, Part 10 of 23 (Binder 6, 2 of 2), pp. 73-83, 84-86.

Documents submitted in the case of *Shuffle Master, Inc. v. Card Austria, et al.*, Case No. CV-N-0508-HDM-(VPC) (Consolidated with Case No. CV-N-02-0244-ERC-(RAM)), May 6, 2003, Part 11 of 23 (Binder 7, 1 of 2), pp. 104-105.

Documents submitted in the case of *Shuffle Master, Inc. v. Card Austria, et al.*, Case No. CV-N-0508-HDM-(VPC) (Consolidated with Case No. CV-N-02-0244-ERC-(RAM)), May 6, 2003, Part 17 of 23 (Binder 8, 5 of 5), pp. 110-119.

\* cited by examiner

METHODS AND APPARATUSES FOR AN AUTOMATIC CARD HANDLING DEVICE AND COMMUNICATION NETWORKS INCLUDING SAME

This application is a continuation of U.S. patent Ser. No. 11/558,818 filed Nov. 10, 2006, now U.S. Pat. No. 8,616,552, issued Dec. 31, 2013, which is a continuation-in-part of U.S. patent application Ser. No. 09/967,500, filed Sep. 28, 2001, now U.S. Pat. No. 8,337,296, issued Dec. 25, 2012. The present application is also related to the following applications: U.S. patent application Ser. No. 11/558,810, filed Nov. 10, 2006, entitled "CASINO TABLE GAME MONITORING SYSTEM," now abandoned; U.S. patent application Ser. No. 11/558,817, filed Nov. 10, 2006, entitled "METHOD AND APPARATUS PROVIDING GAMING TABLE WITH RFID ANTENNAS AND SHIELDING," now abandoned; and U.S. patent application Ser. No. 11/558,823, filed Nov. 10, 2006, entitled "CASINO CARD SHOES, SYSTEMS, AND METHODS FOR A NO PEEK FEATURE," now abandoned; the contents of each of which are incorporated by reference in their entirety herein.

FIELD OF THE INVENTION

This invention, in various embodiments, relates generally to playing card handling devices and, more specifically, to apparatuses comprising an automatic card handling device suitable for use in a communications network, automatic card handling devices operably coupled to a communication network, and methods of operation thereof.

BACKGROUND OF THE INVENTION

State of the Art: Card handling devices used in the gaming industry are well known in the art and are conventionally used for increasing the efficiency, security and game speed in live table games such as blackjack, baccarat, and various forms of poker. Card handling devices, such as card shufflers, may perform a variety of functions including randomly shuffling one or more decks of playing cards in an efficient and thorough manner. In a live table game, it is important that the playing cards are shuffled in an efficient and thorough manner to prevent players from having an advantage by knowing the position of specific cards or groups of cards in the final arrangement of cards delivered in the play of the game. Additionally, it is advantageous to have the playing cards shuffled in a very short period of time in order to minimize any delay in the play of the game.

Conventional card shufflers may also include a card recognition device which, in addition to aiding in the shuffling of cards, may verify the contents of the deck and ensure that the deck contains not only all the appropriate cards, but also that the deck does not contain any cards which do not belong therein. The card recognition device enables a card shuffler to verify the contents of the deck(s) by using a local computer or a processor contained within the shuffler. The card recognition device of a conventional card shuffler may comprise a camera that takes a picture of each card entered into the shuffler and then extracts the card rank (2-10, Jack-Ace) and suit (spade, club, heart, diamond) from the picture. Alternatively, other conventional card shufflers may comprise a card recognition device that employs sensors and a hardware component that may sense the rank and suit from the face of a card and thereafter convert signals from the sensed data into vector sets. The vector sets are then compared to known vector sets of a verified deck of cards.

Upon completion of the shuffling and verification processes, the card shuffler may send a signal to a local printer which subsequently, upon receipt of the signal, prints a label indicating the appropriate verification information. The label may then be affixed to the shuffled cards and the cards may then be stored in a secured vault until casino personnel subsequently deliver the cards from the vault to the appropriate game table. A dealer may then access the cards and load the shuffled decks into a shoe for immediate use in a casino game.

In addition, conventional card shufflers are capable of performing a self-diagnosis and accordingly, displaying diagnostic results on an associated display device. Diagnostic results may include errors or alerts for events such as card jams, missing cards, extra cards and a host of other abnormal events.

As described above, conventional card handling devices require some level of human control and direction during operation. Currently, casino personnel must stand next to the card handling device as it performs the shuffling and card verification tasks and then monitor the results displayed on a display device located on the card shuffler. Traditionally, casinos and casino personnel are very busy; therefore, it is essential that card handling devices work efficiently. It is equally important that the amount of human hours spent monitoring these devices be as limited as possible in order to allow the casino personnel to attend to other issues elsewhere in the casino.

There is a need for methods and apparatuses to provide increased system efficiency and reliability of a card handling device. Specifically, there is a need for a card handling device that can access a network and communicate with a device user regarding various information including, by way of example only, current or past operation of the device, maintenance or repair of the device, current or past performance of the device, and the location of the device. Such a card handling device would desirably decrease the time and effort involved in the monitoring process, and, therefore, increase the efficiency of the card handling device.

BRIEF SUMMARY OF THE INVENTION

An embodiment of the present invention includes an automatic card handling device comprising a shuffling apparatus that is configured for shuffling an input set of cards and delivering an output set of cards resulting from the shuffling. The automatic card handling device further comprises a detection module configured for recognizing a rank and suit of each card of the output set of cards. The detection module recognizes the rank and suit prior to removal of the output set of cards from the shuffling apparatus. Further included in the automatic card handling device is a communication module operably coupled to the detection module. The communication module is configured for sending and receiving information related to operation of the automatic card handling device across a communication port that is configured for operable coupling to a communication network.

Another embodiment of the present invention includes a network of card handling devices comprising a plurality of automatic card handling devices according to an embodiment of the invention. The network of card handling devices further comprises a communication network operably coupled to the communication port of each automatic card handling device of the plurality.

Another embodiment of the present invention includes a network of card handling devices comprising at least one local communication network. The at least one local communication network comprises at least one automatic card handling device according to an embodiment of the invention. The network of card handling devices further includes at least one local server, wherein each of the at least one local server is operably coupled to one of the at least one local communication network and wherein the at least one local server is configured to send and receive information over the at least one local communication network to which it is coupled.

Another embodiment of the present invention includes a method of operating a network of automatic card handling devices comprising establishing a communication link across a communication network between at least one automatic card handling device and at least one server. The method further includes transmitting information from the at least one automatic card handling device to the at least one server across the communication network, wherein the information is related to the operation of the at least one automatic card handling device.

Yet another embodiment of the present invention includes a computer-readable media storage medium storing instructions that when executed by a processor cause the processor to perform instructions for operating a network of automatic card handling devices according to an embodiment of the invention.

DETAILED DESCRIPTION OF THE INVENTION

The present invention, in various embodiments, comprises apparatuses and methods of operation for an automatic card handling device used within a network of card handling devices to address the efficiency concerns associated with conventional card handling devices.

In the following description, circuits and functions may be shown in block diagram form in order not to obscure the present invention in unnecessary detail. Conversely, specific circuit implementations shown and described are examples only and should not be construed as the only way to implement the present invention unless specified otherwise herein. Additionally, block definitions and partitioning of logic between various blocks is exemplary of a specific implementation. It will be readily apparent to one of ordinary skill in the art that the present invention may be practiced by numerous other partitioning solutions. For the most part, details concerning timing considerations and the like have been omitted where such details are not necessary to obtain a complete understanding of the present invention and are within the abilities of persons of ordinary skill in the relevant art.

Further, the term "module" is used herein in a non-limiting sense and solely to indicate functionality of particular circuits and assemblies included within embodiments of the invention, and may not be construed as requiring a particular physical structure, or particular partitioning between elements of the invention performing indicated functions.

In this description, some drawings may illustrate signals as a single signal for clarity of presentation and description. It will be understood by a person of ordinary skill in the art that the signal may represent a bus of signals, wherein the bus may have a variety of bit widths and the present invention may be implemented on any number of data signals including a single data signal.

When executed as firmware or software, the instructions for performing the methods and processes described herein may be stored on a computer readable medium. A computer readable medium includes, but is not limited to, magnetic and optical storage devices such as disk drives, magnetic tape, CDs (compact discs), DVDs (digital versatile discs or digital video discs), and semiconductor devices such as RAM, DRAM, ROM, EPROM, and Flash memory.

In describing embodiments of the present invention, the systems and elements surrounding the invention are first described to better understand the function of embodiments of the invention as it may be implemented within these systems and elements.

Figure 1:
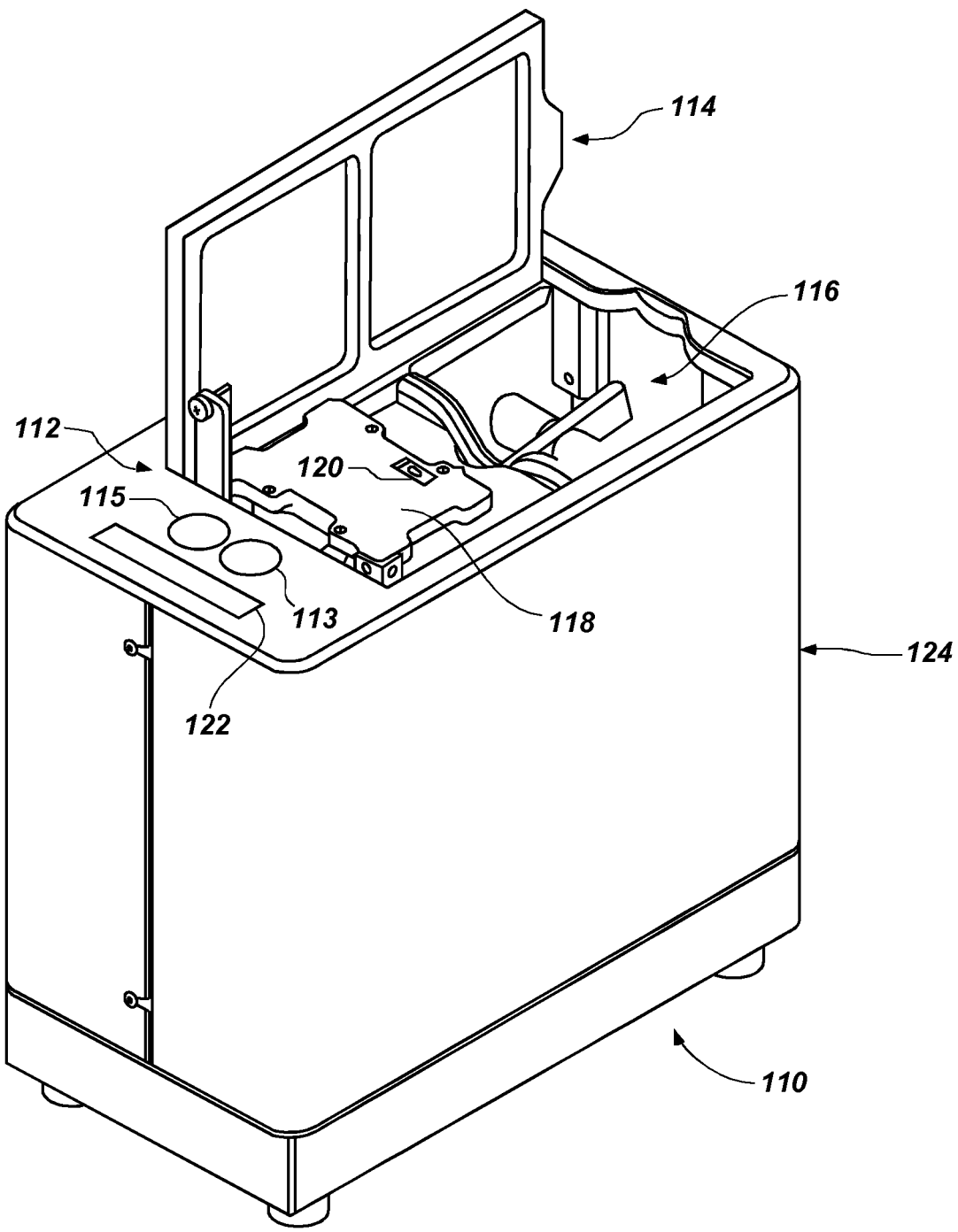
FIG. 1 is an illustration of a card handling device according to an embodiment of the invention.

FIG. 1 illustrates a card handling device 110. A top surface 112 of card handling device 110 may comprise a flip-up cover 114 which, when opened, exposes a card insertion area 116 and an elevator platform 118. Card insertion area 116 may be configured to receive an input set of cards to be shuffled, counted, and/or sorted. By way of example only, card handling device 110 may be configured to receive, read rank and suit, sort, and shuffle up to eight decks of cards at any one time. Elevator platform 118 may be configured to raise a set of shuffled cards to a level where they can be removed by a device user after the shuffling, reading, and/or sorting processes are completed. Elevator platform 118 may include a sensor 120 which detects the presence of cards or other objects located on elevator platform 118. A camera 142 or a card recognition module 154 (see FIGS. 2 and 3) may also be included within the body 124 of card handling device 110. Card handling device 110 may be located adjacent to or flush mounted into a gaming table in a casino where a live card game is taking place, or may be located in a remote location off the casino floor, which is inaccessible to the public.

Card handling device 110 may also be configured to display operational data relating to the device to a display panel 122 located on top surface 112. A casino employee using the card handling device 110 may monitor display panel 122 and view the displayed information in order to know the status of operation of the card handling device 110. Such information displayed on display panel 122 may include the number of cards present in the card handling device 110, the status of any shuffling, reading, or sorting operations, security information relating to the card handling device 110, status relating to a card verification process, or any other information about errors, or the operation of card handling device 110 that would be useful to a user. Buttons 113, 115, located adjacent display panel 122 may be on-off buttons, special function buttons (e.g., raise elevator to the card delivery position, reshuffle demand, security check, card count demand, etc.), and the like.

Figure 2:
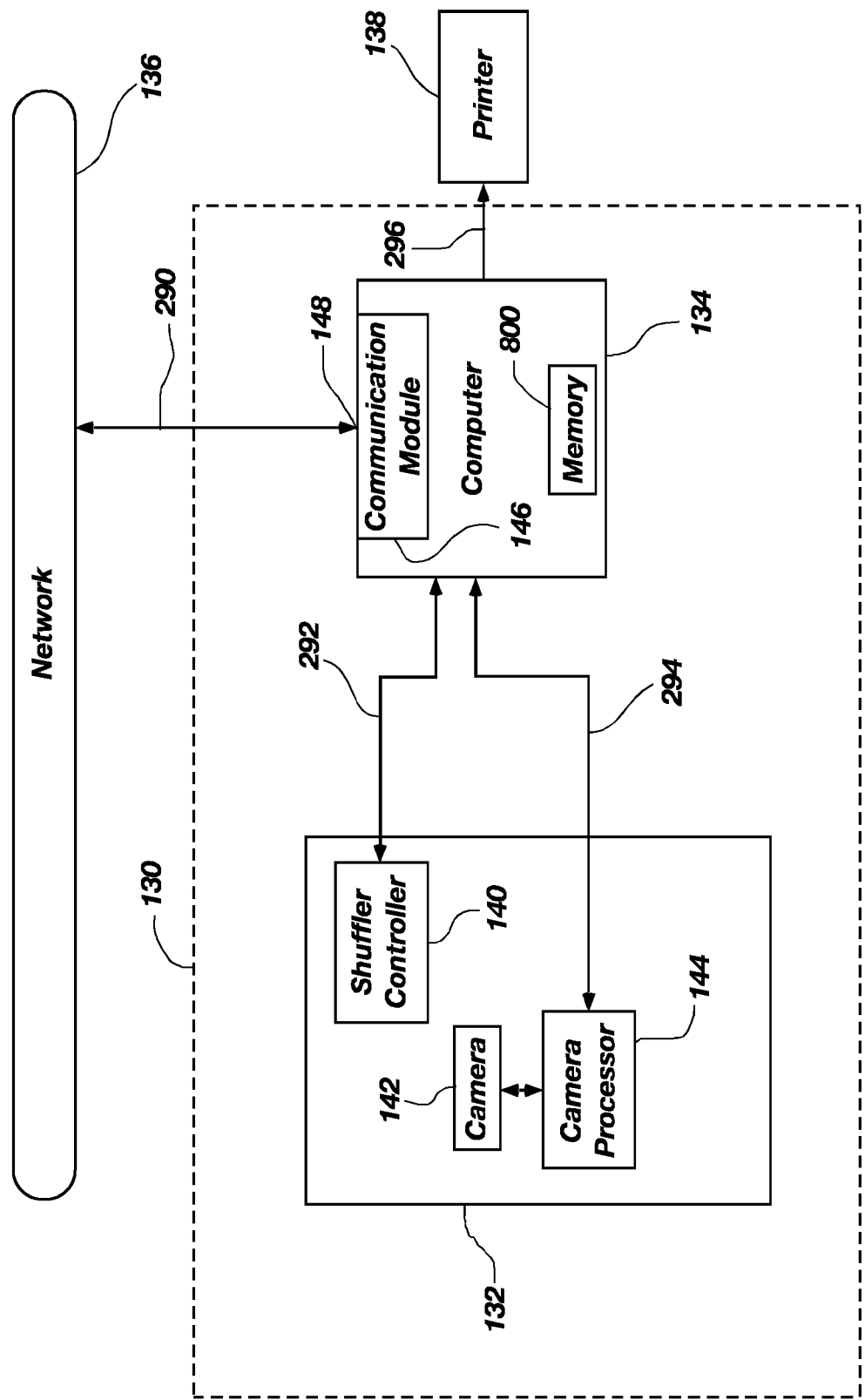
FIG. 2 is a block diagram of an automatic card handling device operably coupled to a local network according to an embodiment of the invention.

FIG. 2 illustrates an embodiment of a card handling device 130 comprising a shuffler 132 operably connected to a computer 134. Shuffler 132 may include a shuffler controller 140, and a camera processor 144 operably coupled to camera 142.

Shuffler controller 140 and camera processor 144 are both operably coupled to computer 134 by connections 292 and 294, respectively. Computer 134 may comprise a communication module 146 and a communication port 148 configured for operable coupling to network 136 via communication link 290. Computer 134 may also be operably coupled to printer 138 via communication link 296. Network 136 may comprise a local network or a publicly accessible network, such as the Internet. Communication links 290 and 296 may comprise any form of wireless or wired connections or any combination thereof. By way of example, and not limitation, communication links 290 and 296 may include serial data links, parallel data links, Ethernet, a Wide Area Network (WAN), a Local Area Network (LAN), 802.11a/b/g, Wi-Fi, and other suitable communications links. As described in more detail below, communication module 146 may be configured to establish an electronic communication with network 136 and thereafter send and receive information to and from network 136 across communication port 148. In another example of the invention, the communication module 146 and memory 800 reside within the shuffler 132 and communicate with the shuffler controller 140.

Upon shuffler 132 receiving an input set of cards, shuffler controller 140 is configured to count the cards and, as the cards are being counted, camera 142 is configured to take a picture of at least a portion of each counted card. Thereafter, data representing pictures and a card count are sent to computer 134 which iterates through the pictures and extracts the card value from the picture of each card. Computer 134 then generates information relating to the input set of cards by associating the value of each individual card with its counted position in the deck. The card information is then used by the computer 134 to verify the contents of the deck by comparing the information relating to the input set of cards to information relating to a standard deck of cards stored in the memory 800 of computer 134. Computer 134 may be configured to operate in multiple modes and may be capable of automatically switching between multiple modes without powering off or rebooting. By way of example, computer 134 may be configured to operate in a set-up mode, run mode, or a service mode, as are explained more fully below.

As described above, card handling device 130 is configured to display, on display panel 122 (see FIG. 1), any data pertaining to the operation of card handling device 130. Card handling device 130 may be further configured to convert the aforementioned operational data into electronic data signals comprising information such as, repair-related data, data related to current or past operation, the serial number of the card handling device 130, the serial numbers of device parts, physical location of card handling device 130, performance, usage, or any other data related to card handling device 130. At any time after an electronic communication has been established by computer 134, communication module 146 may transmit the information through communication port 148 and across network 136 via communication link 290. As described in greater detail below, the information may then be transmitted to a server 162 where the data can be viewed by a device operator, stored, mined, or forwarded to casino personnel or a service center 168 (see FIGS. 5 and 6). Additionally, computer 134 may be configured to send information comprising the shuffling and card verification results to a printer 138 via communication link 296. Printer 138 may be configured to, upon receipt of the information, print a label with the verification results that may then be affixed to the output set of cards, for example. The printer 138 could also print a wide variety of messages, such as service requests, hours of operation, number of batches of cards shuffled, particular cards missing, and the like.

Figure 3A:
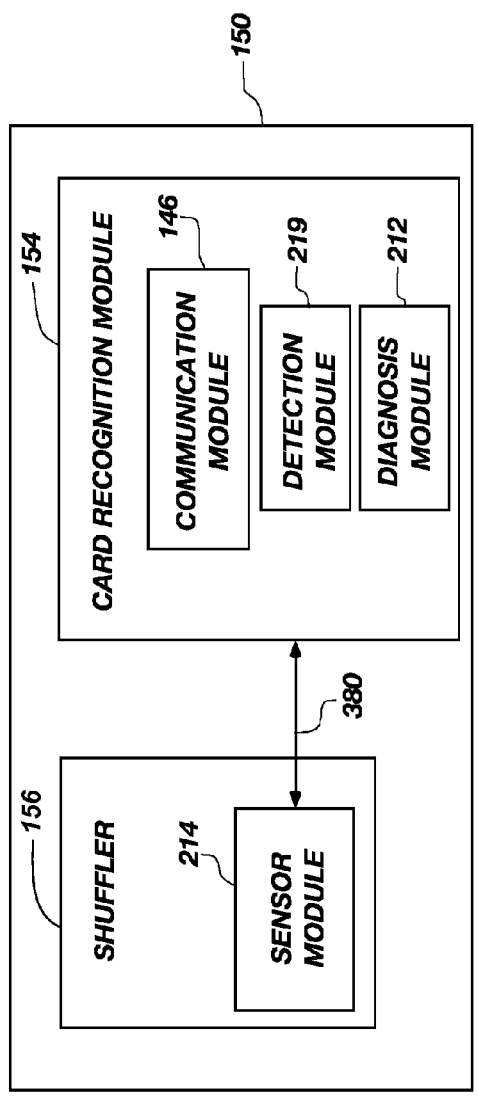
FIGS. 3(a), 3(b) and 3(c) are block diagrams of an automatic card handling device according to embodiments of the invention.
Figure 3C:
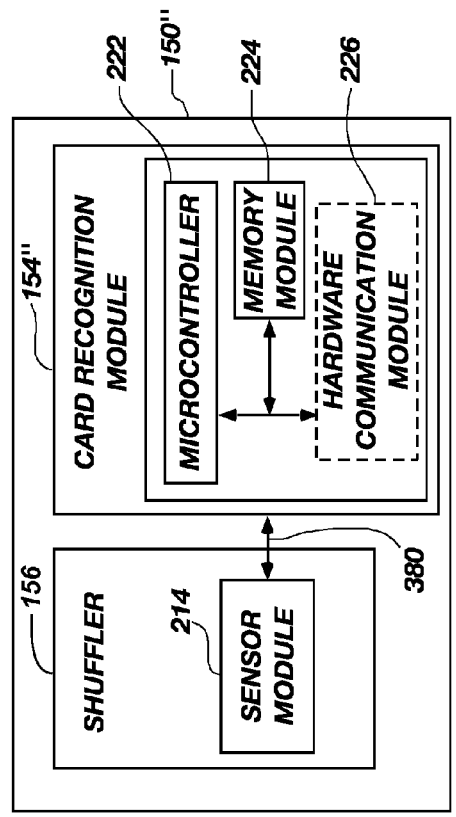
Figure 3B:
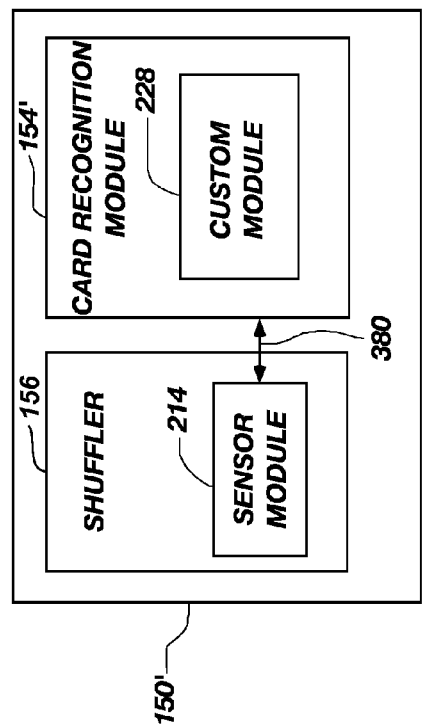

FIGS. 3(a) through 3(c) illustrate various embodiments of card handling device 150. FIG. 3(a) illustrates a logical partitioning of functions within the card recognition module 154, whereas FIGS. 3(b) and 3(c) illustrate different embodiments of physical partitioning of the card recognition module 154. Of course, these partitioning solutions, both logical and physical, are example solutions, other embodiments with different partitioning solutions are contemplated within the scope of the invention.

As illustrated in the logical partitioning of FIG. 3(a), card handling device 150 includes a shuffler 156 and a card recognition module 154. Shuffler 156 includes a sensor module 214 that is operably coupled to card recognition module 154 via connection 380 and is configured for sensing image information about each card included in an input set of cards. The sensor module 214 may include, for example, a two-dimensional CMOS image sensor, a two-dimensional charge coupled device (CCD) image sensor, or a one-dimensional line sensor, as are known by those in the art. Card recognition module 154 comprises a communication module 146 configured for establishing an electronic communication with a local network or a world-wide network. Communication module 146 may be further configured to transmit and receive information over the network. Further included in the card recognition module 154 is a detection module 219 configured for verifying the contents of an input set of cards, and a diagnosis module 212 configured for performing a self-diagnosis on the operation of card handling device 150, as are explained more fully below.

FIG. 3(b) illustrates a physical partitioning embodiment of card handling device 150' wherein the card recognition module 154' comprises a custom module 228 including custom logic configured to establish an electronic communication with a network and thereafter transmit and receive information over the network. The custom module 228 may include logic configured for performing the functions of the communication module 146, the detection module 219, and the diagnosis module 212. By way of example, and not limitation, the custom module 228 may be implemented as a custom application specific integrated circuit (ASIC), a field programmable gate array (FPGA), one or more programmable logic devices (PLDs) and similar devices for implementing custom logic as are known to those of ordinary skill in the art.

In another embodiment of card handling device 150", card recognition module 154" may comprise, as illustrated in FIG. 3(c), a microcontroller 222 operably coupled to a memory module 224. Microcontroller 222 may be configured to perform the functions of the communication module 146, the detection module 219, and the diagnosis module 212. As such, microcontroller 222 may be configured to establish an electronic communication with a network and transmit and receive information over the network by employing software or firmware stored on memory module 224. Of course, many microcontrollers suitable for the card recognition module 154", may include memory as part of the microcontroller 222. Therefore, a memory module 224 external to the microcontroller 222 may not be necessary.

In another embodiment, card recognition module 154" may include a hardware communication module 226. In this configuration, the communication function may be implemented completely in hardware, or may be a combination of hardware and software functions configured to establish an electronic communication with a network and thereafter transmit and receive information over the network.

Although the card recognition module 154 in the figures is shown as part of the shuffler 156, in other embodiments, the card recognition module 154 may be located in an external computer that communicates with the shuffler.

Figure 4:
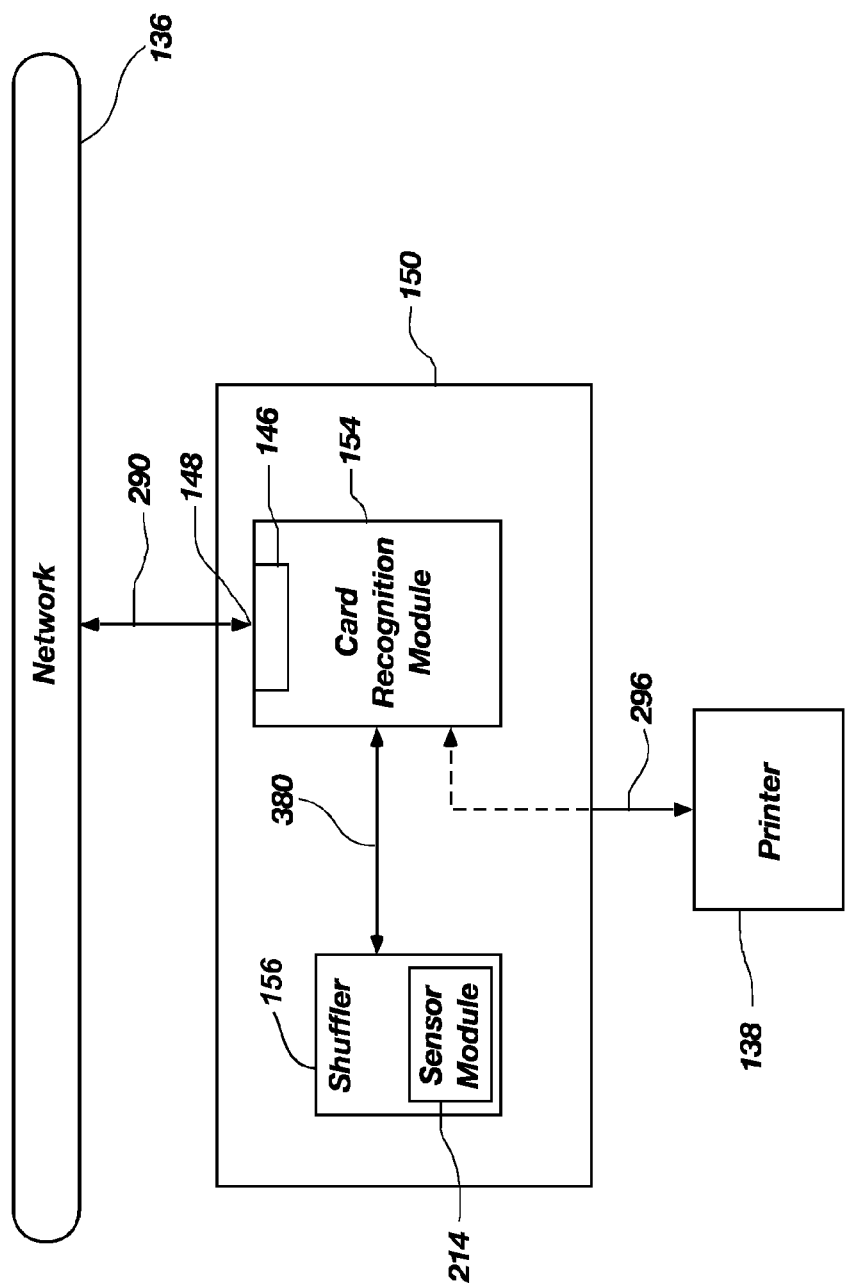
FIG. 4 is a block diagram of an automatic card handling device operably coupled to a local network according to an embodiment of the invention.

FIG. 4 illustrates another embodiment of the invention wherein card handling device 150 is coupled to network 136. Card handling device 150 may comprise a shuffler 156 and a card recognition module 154 operably coupled together by way of connection 380. Additionally, card recognition module 154 may comprise a communication module 146 and a communication port 148 directly coupled to network 136 via communication link 290. Card recognition module 154 may also be operably coupled to printer 138 via communication link 296. As described above, communication module 146 may be configured to establish an electronic communication with network 136 and thereafter send and receive information over network 136, which may comprise a local network or a world-wide network. Communication links 290 and 296 may comprise any form of wireless or wired connections or any combination thereof.

The operation of card handling device 150 depicted in FIG. 4 will now be described. As a set of input cards is placed into card handling device 150, shuffler 156 is configured to shuffle the input set of cards, and sensor module 214 captures image information about each card either before, during or after the shuffling process. The image information is sent to the card recognition module 154 where the detection module 219 (see FIG. 3(*a*)) processes the image information for each card to determine the rank and suit of each card. The image information may be transformed into a rank and suit by an image recognition process of the rank and suit designations on each card. As explained earlier, the image recognition process may be performed as software/firmware operating on the microcontroller 222 or may be performed by custom logic within the custom module 228 (see FIGS. 3(*a*)-3(*c*)). Card recognition module 154 may be configured to operate in multiple modes and may be capable of automatically switching between multiple modes without powering off or rebooting. By way of example, card recognition module 154 may be configured to operate in a set-up mode, run mode, or a service mode, as are explained more fully below.

In addition to shuffling and verifying the contents of an input set of cards, card handling device 150 may, at any time while powered on, establish an electronic communication with network 136. Thereafter, card handling device 150 may transmit the results of the shuffling and verification processes or any other data relating to the card handling device 150, such as, diagnostic messages, identity messages, and location messages over network 136 to server 162 (see FIGS. 5 and 6). Furthermore, card recognition module 154 may be configured to send information comprising the shuffling, maintenance information, power, operational information, and card verification results to a printer 138 by way of communication link 296. Printer 138 may be configured to, upon receipt of the information, print a label or other report with information such as verification results that can then be affixed to the output set of cards.

Figure 5:
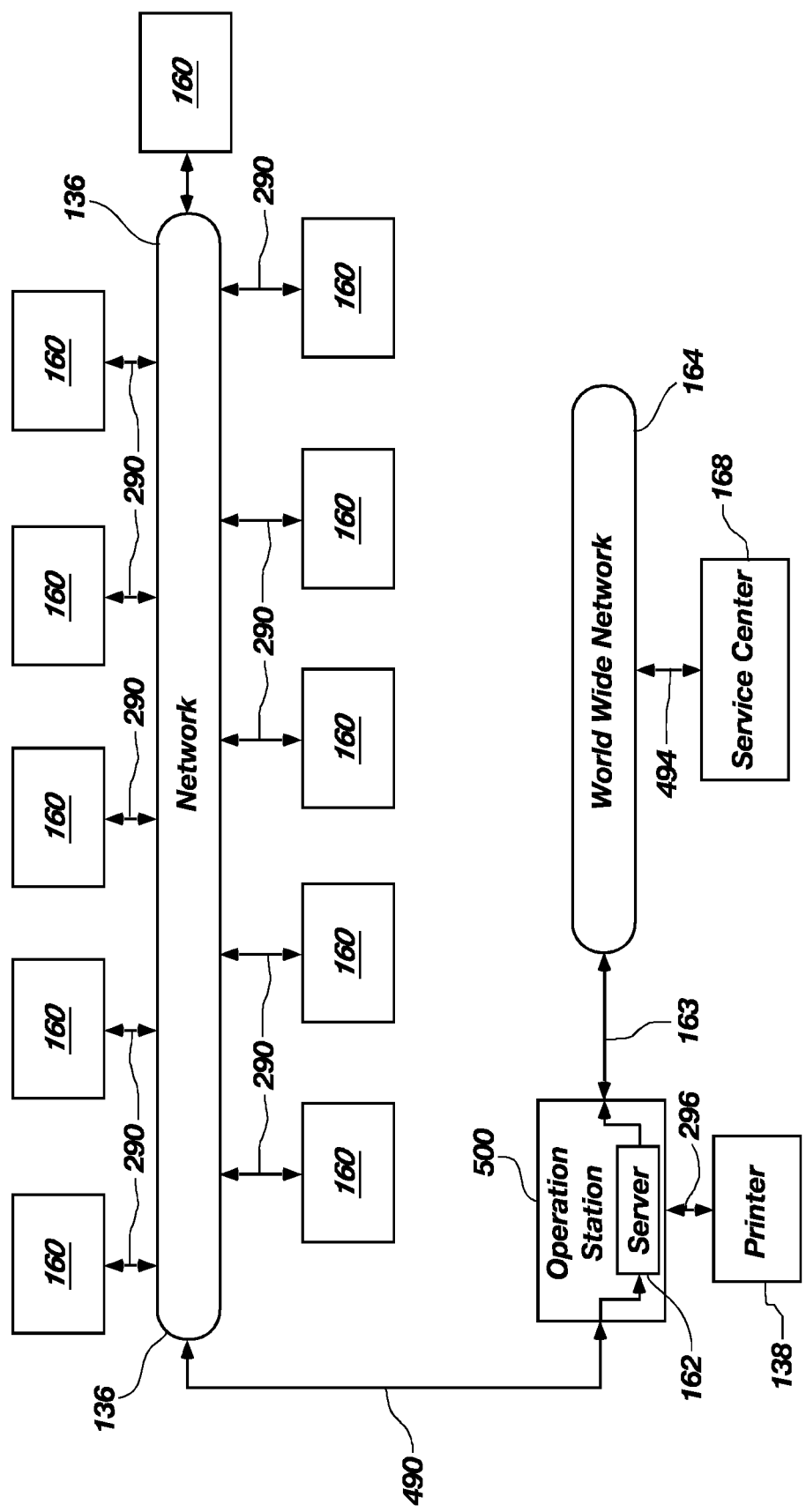
FIG. 5 is a block diagram of a network of automatic card handling devices in accordance with an embodiment of the invention.

FIG. 5 illustrates an embodiment of the invention comprising a network of card handling devices 160. Card handling devices 160 may be located on a casino floor adjacent a playing table or in a back-room location off the casino floor and may be comprised of either card handling device 130 described in FIG. 2, or card handling device 150 described in FIGS. 3 and 4. Each card handling device 160 is operably coupled to a network 136 over corresponding communication links 290. Network 136 may be operably coupled via communication link 490 to a server 162 located within operator station 500 which is a computerized machine control system. Operator station 500 and server 162 may be located within the casino property and may be operably coupled to printer 138 and a world-wide network 164 by communication links 296 and 163, respectively. Server 162 may be located within operator station 500, as shown in FIG. 5, or may be located separate from, and operably coupled to, operator station 500. A service center 168, which may be located either on the casino property or at a remote location, may be operably coupled to server 162 across world-wide network 164 via communication links 494 and 163. Communication links 163, 290, 296, 490, and 494 may comprise any form of wireless or wired connections, or any combination thereof.

Figure 6:
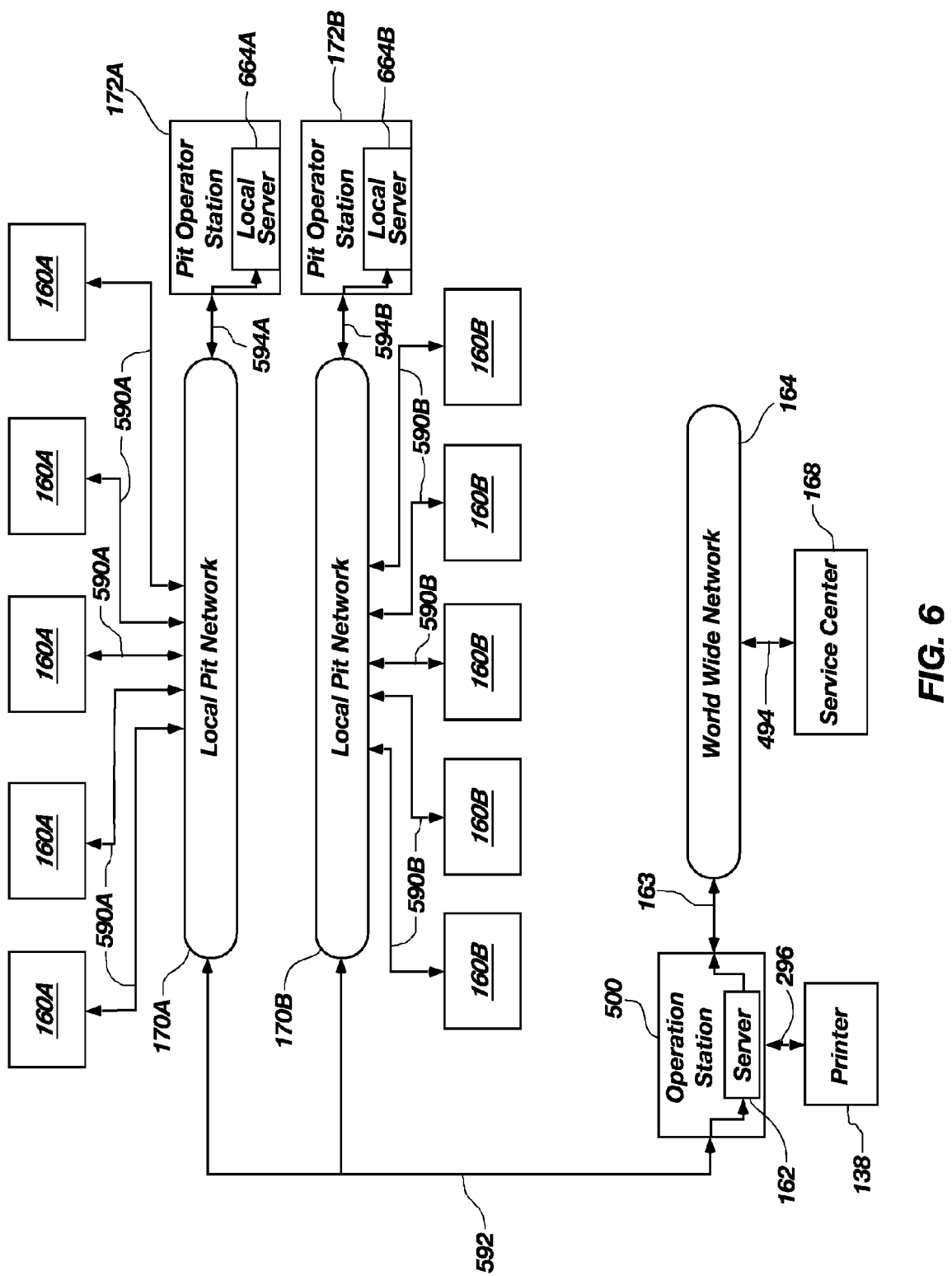
FIG. 6 is a block diagram of another network of automatic card handling devices according to an embodiment of the invention.

The operation of the network of card handling devices depicted in FIG. 5 will now be described. At any time while a card handling device 160 is powered on, the card handling device 160 may establish an electronic communication with network 136 and thereafter transmit any information pertaining to the card handling device 160 across network 136 to server 162. As illustrated in FIGS. 5 and 6, server 162 is located within operator station 500. Therefore, any data received by server 162 may be accessed by a device operator within operator station 500. Conversely, if server 162 is located outside of operator station 500, any data received at server 162 may be forwarded to operator station 500. As such, a device operator accessing operator station 500 may receive the information and monitor the status of each card handling device 160. Upon receipt of any information, server 162 may be configured to store, mine, assemble, or forward the information to casino personnel or to a device technician located within service center 168. For example only, casino personnel or a device technician may receive the transmitted information by way of a graphical user interface (GUI) comprising a visual or audio alerting system on a computer, cell phone, or other like data receiving device.

By way of example only, card handling device 160 may be configured to transmit an email or a text message, containing the operational status of one or more card handling devices 160, to server 162, which may then transmit the email or text message to service center 168 or any data receiving device belonging to casino personnel. A transmitted email or text message may comprise, for example, information detailing whether the input set of cards has successfully passed the shuffling and verification processes. If the input set of cards has failed the verification process, a transmitted email or text message may contain the reasons for failure, and may list the missing card or cards should the card handling device 160 detect a missing card or cards. Other data contained in an email, text message or the like may comprise information identifying the location of the card handling device 160, the name and location of the casino, and directions to the casino as well as the casino pit where the card handling device 160 resides. Card handling device 160 may also be configured, upon diagnosing a problem, to transmit an alert or a request across network 136 to server 162. Thereafter, server 162 may forward the alert or request to operator station 500, casino personnel, or to service center 168.

Card handling device 160 may also be configured to generate a report comprising a description of the location and relative performance of all the operational elements of card handling device 160. The generated report may then be transmitted electronically over network 136 to server 162. Server 162 may then forward the report to service center 168, or to a computer, cell phone or any other data receiving device belonging to a device technician or casino personnel. Upon receipt of a generated report, casino personnel or a device technician can quickly locate the corresponding card handling device 160 and, thereafter, may address current problems or future problems that may eventually exist in the corresponding card handling device 160. The report could generate a repair request, a preventative maintenance request, or could identify the device as requiring a software upgrade, etc.

Additionally, the card handling device 160 may be configured to receive information comprising messages and instructions such as, work commands or a self-diagnosis request from a device operator located within operator station 500. As such, in addition to monitoring multiple card handling devices 160, a device operator located within operator station 500 may control multiple card handling devices 160 at any given time. Additionally, a technician, located at a remote location such as service center 168, may perform troubleshooting routines or install software or firmware upgrades and patches on card handling device 160 by using an electronic communication link between the card handling device 160 and a computer (not shown) located within service center 168.

As described above, card handling device 160 may be configured to operate in multiple modes and may be capable of automatically switching between modes without powering off or rebooting. As such, a device operator may simultaneously control multiple card handling devices 160 by changing the operation mode of a card handling device 160 and thereafter running programs on, sending data requests, or sending work commands to the card handling device 160. By way of example, and not limitation, a device operator located within an operator station 500 may switch a card handling device 160 to a service mode and request a self-diagnosis, conduct troubleshooting routines, or install software updates and patches. Additionally, card handling device 160 may, upon receiving an input set of cards, automatically switch to a set-up mode and activate a calibration check in order to verify proper calibration before switching to a run mode to thereafter shuffle and/or verify the input set of cards.

FIG. 6 illustrates another embodiment of the invention comprising a network of card handling devices 160A networked together according to a common trait, such as physical location and/or game type. The following description, although in reference to card handling devices 160A, local pit network 170A and pit operator station 172B, also applies to card handling devices 160B, local pit network 170B and pit operator station 172B, as well as communication links 590B and 594B. For example only, a network of card handling devices 160A located on a single casino floor or within a limited area of a single casino floor may be networked together. Likewise, for example, a network of card handling devices 160A pertaining to a specific game type, such as blackjack, may be networked together. Each card handling device 160A in a similar network is operably coupled by communication link 590A to a local pit network 170A which may correspond to, as described above, the location or the game type of the card handling device 160A. Each local pit network 170A is, in turn, operably connected by communication link 594A to a local pit operator station 172A. As illustrated in FIG. 6, pit server 664A is located within pit operator station 172A. Therefore, any data received by pit server 664A may be accessed by a device operator within pit operator station 172A. Conversely, pit server 664A may be located outside of pit operator station 172A and any data received at pit server 664A may be forwarded to pit operator station 172A.

As described above, at any time while powered on, each card handling device 160A located within a local pit network 170A may be configured to establish an electronic communication with local pit network 170A, and transmit information relating to its operation to pit server 664A. Also, each card handling device 160A may be configured to receive messages or instructions from pit server 664A. As such, a pit operator, located within pit operator station 172A, may simultaneously monitor and control each card handling device 160A located in the corresponding local pit network 170A. Each card handling device 160B is networked together and directly coupled to a local pit network 170B in a similar fashion as described above in reference to each card handling device 160A. Therefore, each card handling device 160B may transmit and receive messages to and from pit server 664B over local pit network 170B.

In addition, local pit networks 170A/170B may be operably coupled to server 162, via communication link 592. Server 162 may be operably connected to a printer 138 via communication link 296. Service center 168 may be operably coupled to server 162 across a world-wide network 164 via communication links 494 and 163. In addition to transmitting and receiving information to and from the pit server 664A/664B, each card handling device 160A/160B may, as described above, transmit and receive information to and from server 162 across local pit networks 170A/170B. As such, a device operator located within operator station 500 may simultaneously monitor and control each card handling device 160A/160B of each local pit network 170A/170B. The operational data transmitted from card handling device 160A/160B and received at server 162 may be viewed by a device operator, stored, mined, assembled, or forwarded on to service center 168 over world-wide network 164. Additionally, the operational data may be transmitted to a computer, cell phone, or like data receiving device belonging to casino personnel. Communication links 296, 494, 590A, 590B, 592, and 594A, 594B may comprise any form of wireless or wired connections or any combination thereof.

Additionally, the card handling device 160A/160B may be configured to receive information comprising messages and instructions such as, work commands or a self-diagnosis request from a device operator located within operator station 500. As such, in addition to monitoring multiple card handling devices 160A/160B, a device operator located within operator station 500 may control multiple card handling devices 160A/160B at any given time. Additionally, a technician, located at a remote location such as service center 168, may perform troubleshooting routines or install software upgrades and patches on card handling device 160A/160B by using an electronic communication link between the card handling device 160A/160B and a computer (not shown) located within service center 168.

Specific embodiments have been shown by way of example in the drawings and have been described in detail herein; however, the invention may be susceptible to various modifications and alternative forms. It should be understood that the invention is not intended to be limited to the particular forms disclosed. Rather, the invention includes all modifications, equivalents, and alternatives falling within the spirit and scope of the invention as defined by the following appended claims.

What is claimed is:

1. An automatic card handling device, comprising:
  a shuffling apparatus configured to shuffle an input set of cards and deliver randomly ordered cards resulting from the shuffling; and
  a computing device comprising:
    a diagnosis module configured to perform a self-diagnosis of the card handling device and determine operational data indicating functionality parameters of the shuffling apparatus, wherein the functionality parameters include diagnostic results of the self-diagnosis; and a communication module configured to transmit at least some of the operational data including the diagnostic results of the self-diagnosis to an alerting system configured to present the at least some of the operational data to a device technician, the alerting system operably coupled to a communication network coupled to one or more servers and one or more other card handling devices.

2. The automatic card handling device of claim 1, wherein the computing device comprises at least one computing device selected from the group consisting of a microcontroller, a custom application specific integrated circuit (ASIC), a field programmable gate array (FPGA), one or more programmable logic devices (PLDs), and a hardware communication module.

3. The automatic card handling device of claim 2, wherein the diagnosis module is further configured to perform the self-diagnosis responsive to receiving a diagnostic request via the communication module from the one or more servers.

4. The automatic card handling device of claim 1, wherein the diagnosis module is further configured to determine the operational data as repair-related data.

5. The automatic card handling device of claim 4, wherein the communication module is further configured to transmit a service request including the repair-related data via the one or more servers to at least one of a service center and one or more data receiving devices in possession of casino personnel.

6. The automatic card handling device of claim 1, wherein the diagnosis module is further configured to determine the functionality parameters as parameters selected from the group consisting of data related to current or past operation, the serial number of the card handling device, the serial numbers of device parts, and physical location of the card handling device.

7. The automatic card handling device of claim 1, further comprising a detection module configured to recognize a rank and suit of each card of the delivered cards prior to removal of the cards from the shuffling apparatus.

8. The automatic card handling device of claim 7, further comprising a microcontroller configured to perform the functions of the diagnosis module, the detection module, and the communication module.

9. A method of operating a card handling device, the method comprising:
shuffling an input set of cards and delivering randomly ordered cards resulting from the shuffling with a shuffling apparatus;
performing a self-diagnosis of the card handling device;
determining operational data indicating functionality parameters of the shuffling apparatus, the functionality parameters including diagnostic results of the self-diagnosis of the card handling device; and
transmitting at least some of the operational data including the diagnostic results of the self-diagnosis to an alerting system configured to present the at least some of the operational data including the diagnostic results to a device technician, the alerting system operably coupled to a communication network coupled to one or more servers, and one or more other card handling devices.

10. The method of claim 9, wherein transmitting the at least some of the operational data to the alerting system comprises transmitting the at least some of the operational data to at least one of a computer and a cellular phone of the device technician, wherein the at least one of the computer and the cellular phone includes a graphical user interface configured to present the at least some of the operational data to the device technician.

11. The method of claim 1, further comprising performing the self-diagnosis responsive to receiving a diagnostic request from the one or more servers.

12. The method of claim 9, wherein determining operational data comprises determining repair-related data.

13. The method of claim 12, further comprising transmitting a service request including the repair-related data via the one or more servers to at least one of a service center and one or more data receiving devices in possession of casino personnel.

14. The method of claim 9, further comprising determining the functionality parameters as parameters selected from the group consisting of data related to current or past operation, the serial number of the card handling device, the serial numbers of device parts, and physical location of the card handling device.

15. The method of claim 9, further comprising recognizing a rank and suit of each card of the delivered cards prior to removal of the cards from the shuffling apparatus.

16. A system configured to enable card handling devices to communicate through a network, the system comprising:
one or more card handling devices, each card handling device of the one or more card handling devices comprising:
a shuffling apparatus configured to shuffle an input set of cards and deliver randomly ordered cards resulting from the shuffling; and
a computing device comprising:
a diagnosis module configured to perform a self-diagnosis of the card handling device and determine operational data indicating functionality parameters of the shuffling apparatus, wherein the functionality parameters include diagnostic results of the self-diagnosis; and
a communication module configured to transmit the operational data including the diagnostic results of the self-diagnosis over a network; and
a remote server configured to communicate over the network and perform at least one operation selected from the group consisting of:
sending a request for at least some of the operational data including the diagnostic results of the self-diagnosis to at least one of the one or more card handling devices; and
receiving at least some of the operational data including the diagnostic results of the self-diagnosis from at least one of the one or more card handling devices.

17. The system of claim 16, wherein the remote server is configured to send and receive information across a worldwide network.

18. The system of claim 16, further comprising a service center operably coupled to the remote server over a worldwide network.

19. The system of claim 16, wherein the remote server is further configured to send the request as a request for the operational data to include repair-related data.

20. The system of claim 16, wherein the remote server is further configured to send the request as a request for the operational data to include the functionality parameters as parameters selected from the group consisting of data related to current or past operation, the serial number of the card handling device, the serial numbers of device parts, and physical location of the card handling device.

* * * * *